(12) United States Patent
Schenk

(10) Patent No.: US 12,173,825 B2
(45) Date of Patent: Dec. 24, 2024

(54) METHOD FOR AUTOMATED COUPLING A DEVICE TO A WATER SUPPLY, DEVICE AND SYSTEM

(71) Applicant: HUSQVARNA AB, Huskvarna (SE)

(72) Inventor: Christoph Schenk, Oberdischingen (DE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 18/558,028

(22) PCT Filed: Dec. 13, 2021

(86) PCT No.: PCT/EP2021/085406
§ 371 (c)(1),
(2) Date: Oct. 30, 2023

(87) PCT Pub. No.: WO2022/228707
PCT Pub. Date: Nov. 3, 2022

(65) Prior Publication Data
US 2024/0218951 A1   Jul. 4, 2024

(30) Foreign Application Priority Data
Apr. 30, 2021 (EP) .................................... 21171509

(51) Int. Cl.
*F16L 37/44* (2006.01)
(52) U.S. Cl.
CPC .................................... *F16L 37/44* (2013.01)
(58) Field of Classification Search
CPC ......... F16L 37/44; F16L 37/002; A01G 25/09
See application file for complete search history.

(56) References Cited

U.S. PATENT DOCUMENTS 6,431,475 B1 * 8/2002 Williams ............... A01G 25/09
239/749
8,989,907 B2 * 3/2015 Schmidt ................ A01G 29/00
701/1
(Continued)

FOREIGN PATENT DOCUMENTS

EP          1801479 A1    6/2007
JP       S59-194192 A    11/1984
(Continued)

OTHER PUBLICATIONS

International Preliminary Report on Patentability from International Application No. PCT/EP2021/085406 mailed Mar. 15, 2023, all enclosed pages cited.

(Continued)

*Primary Examiner* — Mussa A Shaawat
(74) *Attorney, Agent, or Firm* — Burr & Forman LLP

(57) ABSTRACT

The invention relates to a method for automated coupling a device (2), in particular an irrigation robot (300), to a water supply (3) and decoupling the device (2) from the water supply (3), wherein the device (2) is provided with a first coupling device (100) having a central duct (105, 205) and the water supply (3) is provided with a second coupling device (200) having a central duct (105, 205) and a valve (240) for opening and closing the central duct (205). The invention relates further to the device (2) and a system (1) comprising the device (2) and the water supply (3).

18 Claims, 16 Drawing Sheets

(56) References Cited

U.S. PATENT DOCUMENTS

| | | | | |
|---|---|---|---|---|
| 11,910,760 | B2* | 2/2024 | Schenk | A01G 25/09 |
| 2005/0199842 | A1* | 9/2005 | Parsons | A01G 25/16 |
| | | | | 239/69 |
| 2013/0153673 | A1* | 6/2013 | Younis | A01G 25/16 |
| | | | | 239/69 |
| 2015/0359185 | A1* | 12/2015 | Guy | G05D 1/0246 |
| | | | | 239/11 |
| 2016/0366842 | A1* | 12/2016 | Guy | A01G 25/167 |
| 2017/0020087 | A1* | 1/2017 | Younis | A01G 25/16 |
| 2017/0361456 | A1* | 12/2017 | He | A01D 34/008 |
| 2018/0020611 | A1* | 1/2018 | LaRowe | A01M 25/006 |
| | | | | 701/2 |
| 2019/0069496 | A1* | 3/2019 | Wofford | A01G 25/09 |
| 2019/0278269 | A1* | 9/2019 | He | G05D 1/0278 |
| 2020/0359582 | A1* | 11/2020 | Tran | G06T 7/0002 |
| 2021/0360853 | A1* | 11/2021 | Herrera | A01D 34/74 |
| 2023/0165200 | A1* | 6/2023 | Katerberg | G05D 1/0088 |
| | | | | 701/50 |
| 2023/0389490 | A1* | 12/2023 | Schenk | A01D 43/14 |

FOREIGN PATENT DOCUMENTS

| | | |
|---|---|---|
| JP | H08-128580 A | 5/1996 |
| WO | 2016202290 A1 | 12/2016 |

OTHER PUBLICATIONS

International Search Report and the Written Opinion from International Application No. PCT/EP2021/085406 mailed Mar. 11, 2022, all enclosed pages cited.

* cited by examiner

METHOD FOR AUTOMATED COUPLING A DEVICE TO A WATER SUPPLY, DEVICE AND SYSTEM

The invention concerns a method for automated coupling a device to a water supply, a device and a system comprising the device.

BACKGROUND OF THE INVENTION

According to the art a coupling system for irrigation units are known. For example there is a so called Gardena plug-in coupling system, in which a fluid-conducting line coupling can be realized by plugging two coupling pieces. One of the two coupling pieces forming the line coupling contains a coupling nipple pointing away from a base body in the flow direction, which surrounds an outlet channel and is enclosed by a coupling sleeve of the second coupling piece. WO 2010/127815 A1 discloses a coupling piece having a main body and a coupling nipple directed away from said main body in a predetermined direction of flow. The coupling nipple surrounds an outlet duct containing a longitudinal axis, and having a sealing body arranged in the main body upstream of the coupling nipple within the main body. Said sealing body prevents a flow of water into the outlet duct in a blocking position by means of a blocking seal and being displaceable counter to the direction of flow from the blocking position into a passage position when a coupling sleeve is plugged onto the coupling nipple in a plugging direction via coupling structures. Upstream of the coupling nipple, the main body is radially widened in the form of an annular surface extending transversely to the plugging direction, and in that the coupling structures contain at least one coupling element which is passed in a sealed manner through an aperture, directed in the plugging direction, in the annular surface and is displaceable in the plugging direction and coupled to the displacement of the sealing body. In the blocking position of the sealing body, the coupling element projects beyond the annular surface. When the coupling sleeve is plugged on, the coupling element is insertable further into the main body by the coupling sleeve. Thus, the coupling piece of WO 2010/127815 A1 comprises a valve, which is opened, when the coupling piece is coupled with the complementary coupling sleeve.

EP 3 479 682 A1 discloses a self-moving irrigation device for irrigating an area, comprising a multitude of wheels, a drive unit for driving at least one of the wheels, an energy accumulator for the drive unit, a water tank, and a pump in fluid communication with the water tank, at least one nozzle connected to the pump for discharging water to the environment, and a control system for controlling the movement of the controlling the movement of the irrigation device and/or the delivery of the water, wherein a light sensor for detecting a light intensity, in particular intensity, in particular an intensity of solar radiation, is provided. A docking station is disclosed for filling up the water tank. If the self-moving irrigation device is correctly docked and a nozzle correctly positioned above a filling opening, a filling procedure is initiated, in which the nozzle of the water supply is opened and water is filled in a free jet from the nozzle to an opening of the water tank. Such a free-jet filling always provides a risk of spilling water around, and necessities an open tank, which provides another risk of spilling water, if the self-moving irrigation device is tilted of its use position.

WO 2016/202290 A1 discloses an intelligent lawn care system. The system comprises a robot and a docking base. The docking base is provided with charging needles for charging the robot and is provided with a water supply comprising a short feed pipe for inserting into an intake pipe of the robot. When the robot contacts a contact switch that it is correctly placed, a valve is opened and water may be filled into a tank of the robot.

CN 109 566 065 A discloses another intelligent lawn care system comprising a robot and a base station. The base station is provided with a water outlet portion for feeding water into a tank of the robot. The system further comprises a valve which is opened, if a control module confirms the robot is in place for filling. The water connection can be made by inserting a water inlet portion or water outlet portion.

CN 108 720744 A discloses a cleaning robot with a base station. The base station is provided with a water inlet and outlet device for injecting water into the washing tank in the docked robot body and pumping sewage from the sewage tank in the robot body. The system described above have a complicated feed-back, necessary for starting a filling procedure.

SUMMARY OF THE INVENTION

It is an objective of the present invention to provide a method for automated coupling a device to a water supply, a device and a system comprising the device allowing an automated coupling an in particular automated decoupling to a water supply, in particular a water socket.

This object is achieved by the method according to claim 1, the device according to claim 7 and the system according to claim 15.

According to a first aspect the present invention relates to a method for automated coupling a device, in particular an autonomously navigating self-driving device, preferably an irrigation robot, to a water supply and decoupling the device from the water supply.

The device is provided with a body and has a first coupling device operably coupled to the body and having a central duct and the water supply is provided with a second coupling device having a central duct and a valve for opening and closing the duct. the method for coupling comprising S1.1) approaching the first coupling device to the second coupling device by automated approaching the device to the position of the second coupling device, S1.2) inserting a nipple of the second coupling device into a sleeve of the first coupling device by driving the first coupling device relative to the body in a direction towards the second coupling device, S1.3) engaging an engagement device of the first or second coupling device with an engagement surface of the other of the first or second coupling device, S1.4) opening the valve, located inside the second coupling device, by a valve opening element arranged with the first coupling device, the valve opening element pressing against a valve opening member of the second coupling device;

and the method for decoupling comprising,

S2.1) closing the valve, located inside the second coupling device, by releasing the valve opening element arranged with the first coupling device, from a valve opening member of the second coupling device, S2.2) disengaging an engagement device of the first or second coupling device with an engagement surface of the other of the first or second coupling device, S2.3) retracting the nipple of the second coupling device from the sleeve of the first coupling device by driving the first coupling device (100) relative to the body (301) in a direction away from the second coupling device, S2.4) distancing the first coupling device from the second coupling device by moving away the device.

The method allows fully automated coupling and decoupling without the intervention of a user in particular for releasing the engagement and/or for providing a water pressure, which might be provided permanently upstream the valve.

The engagement device comprises in particular a securing sleeve and an engagement claw. The engagement claw is in particular spring-loaded.

The water supply might be a kind of water socket, which might be installed at or partially in the ground or at a wall. The water supply is in particular provided at a predetermined height for connecting with the device. The water supply comprises a second coupling device, which might be screwed to a body of the water supply. The second coupling device and/or the water supply might in particular be compatible with other irrigation devices or a hose comprising coupling device as described with WO 2010/127815 A1 above, such that a user might use the water supply for different purposes.

A valve opening element might be a ring or sleeve for example.

In an embodiment, step S1.2 may comprise moving a securing sleeve of the first coupling device towards the second coupling device into a securing position and/or wherein step 1.2 may comprise driving the first coupling device away from the body, and/or wherein step 2.3 may comprise driving the first coupling device towards the body, and/or wherein step 1.2 may comprise driving a motor operably coupled to the first coupling device to cause the first coupling device to move relative to the body in a direction towards the second coupling device and/or wherein step 2.3 may comprise driving a motor operably coupled to the first coupling device to cause the first coupling device to move relative to the body in a direction away from the second coupling device.

In a further embodiment, S2.2 comprises moving a securing sleeve of the engagement device in the extension direction of the nipple for disengaging an engagement claw engaging with the engagement surface.

The securing sleeve may be pushed in the extension direction of the nipple by a releasing element, in particular a releasing sleeve.

The securing sleeve may be retracted in the extension direction by a pinion provided with the first coupling device.

In a further embodiment, for step S1.1 and S1.2, the device, in particular a self-moving irrigation device or irrigation robot, is moved towards the second coupling device, in particular by a horizontal movement, and wherein, for step S2.3 and step S2.4, the device, in particular a self-moving irrigation device or irrigation robot, is moved away from the second coupling device, in particular by a horizontal movement of the device.

The device and/or system comprising the device and a water supply described below is in particular suitable for executing the above method.

According to an aspect the invention relates to a device, comprising a first coupling device having a central duct for coupling a second coupling device having a central duct, the second coupling device comprising a valve.

The first coupling device comprises a pinion and a releasing element movable along a longitudinal axis of the first coupling device, The first coupling device is either provided as male connector comprising a nipple and an engagement surface or provided as female connector comprising a securing sleeve, movable along a longitudinal axis, and is provided with an engagement device.

The pinion is functionally coupled to the releasing element and the releasing element is configured for disengaging of the engagement device of the first coupling device or an engagement device of the second coupling device.

The second coupling device might be part of a water supply as described above.

The engagement device comprises in particular an engagement claw and a securing sleeve. Thus, the releasing element may either retract a securing sleeve provided with a first coupling device for disengaging the engagement claw or push back a securing sleeve provided with the second coupling element for disengaging the engagement claw.

Thus, the first coupling device might be, in a first alternative, provided as male connector comprising a nipple and an engagement surface. In this alternative, it is suitable for coupling a second coupling device being provided as female connector comprising a securing sleeve, movable along a longitudinal axis, which is provided with an engagement device.

In a second alternative, the first coupling device is provided as female connector comprising a securing sleeve, movable along a longitudinal axis, and is provided with an engagement device. In this alternative, the first coupling device is suitable for connecting a second coupling device provided as male connector comprising a nipple and an engagement surface.

The first coupling device may comprise a motor for driving the pinion.

A valve opening element may be arranged with the first coupling device for opening a valve arranged with the second coupling device, wherein in particular the valve opening element is the tip of the nipple or the securing sleeve.

The longitudinal axis may be arranged horizontally or vertically. In case of a longitudinal axis arranged horizontally, the first and the second coupling device have to be adapted to each other for having their horizontal axis at the same height over the ground.

The engagement device may comprise a spring element and an engagement claw, in particular a flexible engagement claw, in particular a spring-loaded engagement claw. The engagement claw is in particular attached with a hinge to the securing sleeve and/or releasing element.

The first coupling device may be provided as male connector, wherein the pinion is coupled with the releasing element, in particular releasing sleeve, and the releasing element pushes against the securing sleeve arranged with the first coupling device for disengaging the engaging device.

The first coupling device may be provided as female connector, wherein the securing sleeve and the releasing element are provided as a single sleeve arranged on the first coupling device, wherein the pinion is arranged for moving the sleeve along the longitudinal axis.

The first coupling device may be provided as female connector, wherein the securing sleeve and the releasing element provided as releasing sleeve are provided as sleeves concentrically arranged on the first coupling device, wherein the pinion is arranged for moving the securing sleeve along the longitudinal axis.

The device may be an irrigation device, in particular a drivable irrigation device, in particular a self-moving irrigation device or irrigation robot. In particular, the irrigation device is provided with at least a pair of wheels, in particular three or four wheels, wherein at least a part of the wheels is driven, and a body. The first coupling device is in particular arranged at a front side or at a back side of the irrigation device.

According to an aspect, the invention relates to system for automated coupling a device in particular as described above, to a water supply, in particular as described above the device comprising a first coupling device having a central duct and the water supply comprising a second coupling device having a central duct. The first coupling device and the second coupling device being provided as male connector and female connector, respectively.

The coupling device provided as male connector comprises a nipple and an engagement surface.

The coupling device provided as female connector is provided with a securing sleeve, movable along a longitudinal axis, and is provided with an engagement device for engaging with the engagement surface of the coupling device provided as male connector.

The second coupling device comprising a valve.

The first coupling device comprises a pinion and a releasing element movable along a longitudinal axis of the first coupling device, wherein the pinion is functionally coupled to the releasing element and wherein a movement of the releasing element induces a disengagement of the engagement device.

The present system allows self-coupling without any electrical sensors or feed-back control system or intervention of a user. A permanent water pressure may be provided at the water supply and the valve is only opened, when the device is mechanically connected with the water supply.

The valve may comprise a seal cone or sealing element and a valve opening member. The valve opening member is in particular mechanically connected to a sealing element of the valve, in particular a seal cone, such that pushing the valve opening element pushes the seal cone or sealing element to the position, in which the valve is open.

In one embodiment, a second coupling device is provided as female connector, and the first coupling device is provided as male connector, wherein the pinion is coupled with the releasing element, in particular releasing sleeve, and the releasing element pushes against the securing sleeve arranged with the first coupling device for disengaging the engaging device.

In a different embodiment, the second coupling device is provided as male connector and the first coupling device is provided as female connector, wherein the securing sleeve and the releasing element, being a releasing sleeve, are provided as a single sleeve arranged on the first coupling device, wherein the pinion is arranged for moving the sleeve along the longitudinal axis.

In another embodiment, the second coupling device is provided as male connector and the first coupling device is provided as female connector, wherein the securing sleeve and the releasing sleeve are provided as sleeves concentrically arranged on the first coupling device, wherein the pinion is arranged for moving the securing sleeve along the longitudinal axis.

BRIEF DESCRIPTION OF THE DRAWING

The various aspects of the invention, including its particular features and advantages, will be readily understood from the following detailed description and the accompanying drawing, in which.

DETAILED DESCRIPTION OF PREFERRED EMBODIMENTS

Figure 1:
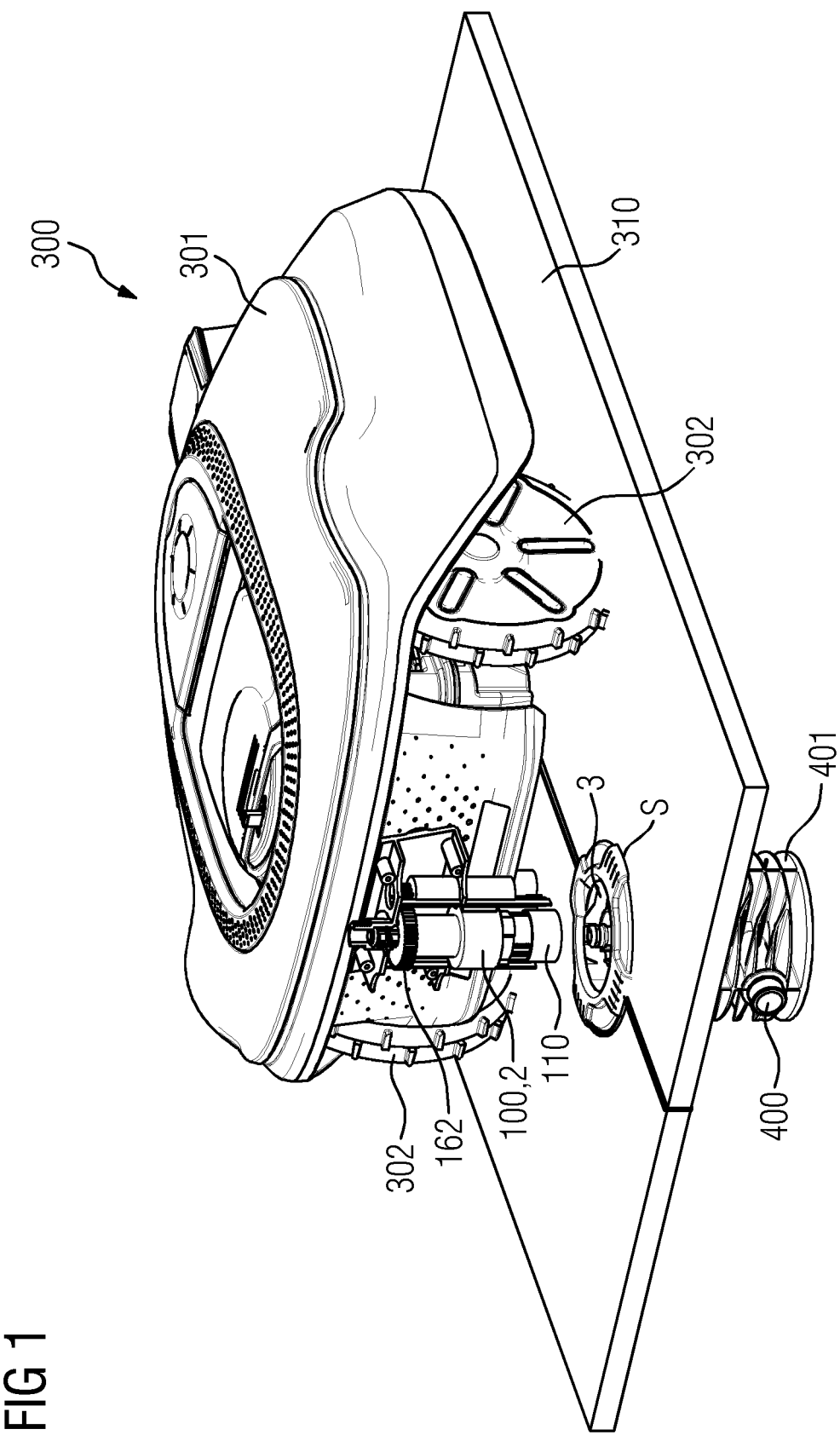
FIG. 1 shows an irrigation robot according to the first embodiment in a first view.

The present invention will now be described more fully with reference to the accompanying drawings, in which example embodiments are shown. However, this invention should not be construed as limited to the embodiments set forth herein. Throughout the following description, similar reference numerals have been used to denote similar elements, parts, items or features, when applicable.

Figure 2:
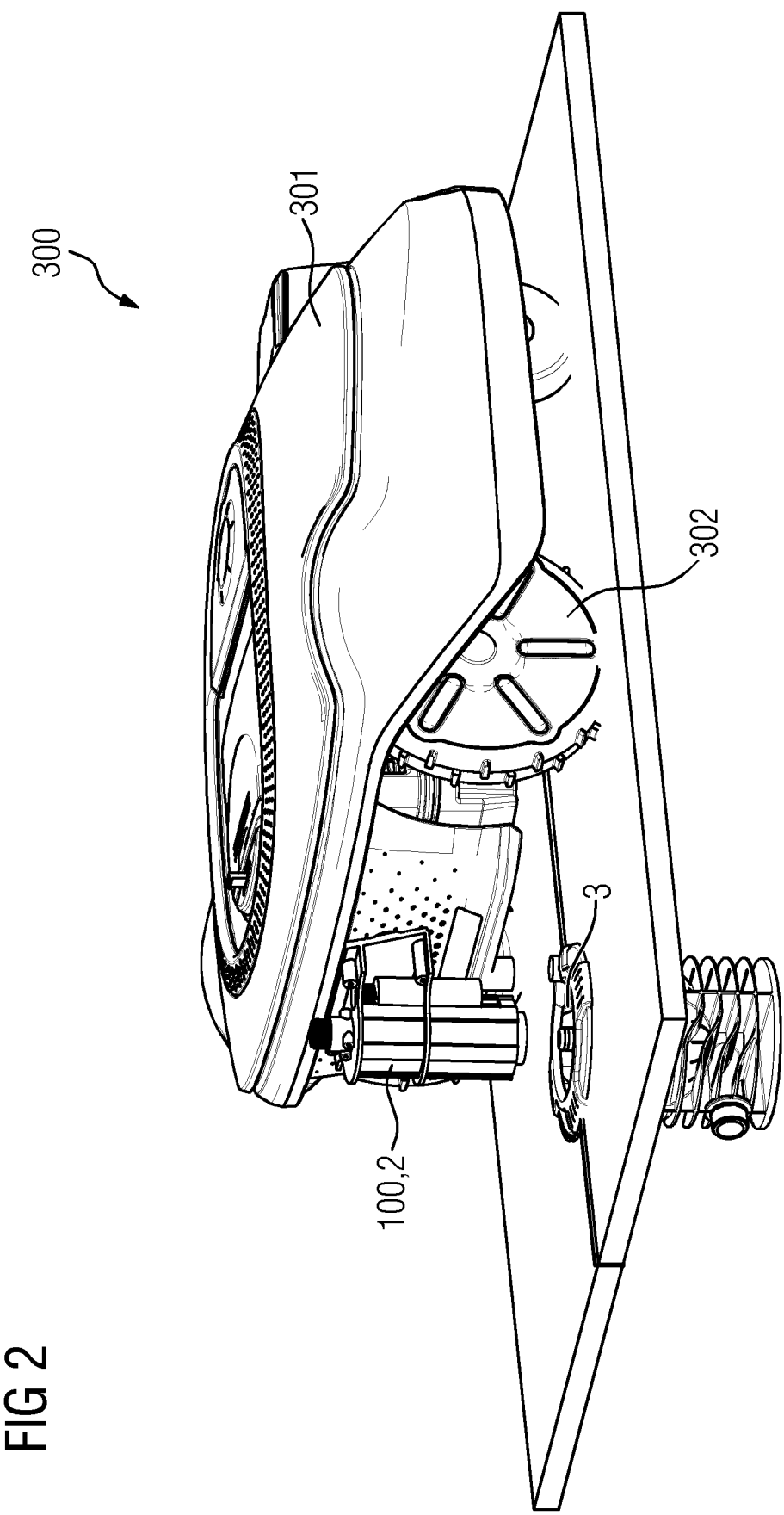
FIG. 2 shows an irrigation robot according to the first embodiment in a second view.

FIGS. 1 and 2 show an irrigation robot 300. The irrigation robot is a self-driving device having a body 301 and wheels 302. In particular the irrigation robot 300 is provided with two larger drive-wheels 302 and two smaller auxiliary wheels for driving on a ground 310. However, a different wheel configuration is possible as well. The irrigation robot 300 is provided as device 2 having a first coupling device 100 for coupling a water supply 3. The first coupling device 100 is located at a rear side of the irrigation robot 300, however, the first coupling device 100 might be as well placed on the opposite side of the irrigation robot. The device 2 is provided with a sleeve having a vertical longitudinal axis. The water supply is provided as a ground socket S having a body 401 and a water inlet 400. The water inlet 400 is placed subsurface, resp. below the ground 310 for being connected by a subterranean water line.

FIGS. 3 to 14 concern a first embodiment of the system. FIGS. 3 to 14 shows a coupling and decoupling of a device 2 to a water supply 3. The device 2 is provided with a first coupling device 100 having a central duct and the water supply 3 is provided with a second coupling device 200 having a central duct and a valve for opening and closing the duct.

Figure 3:
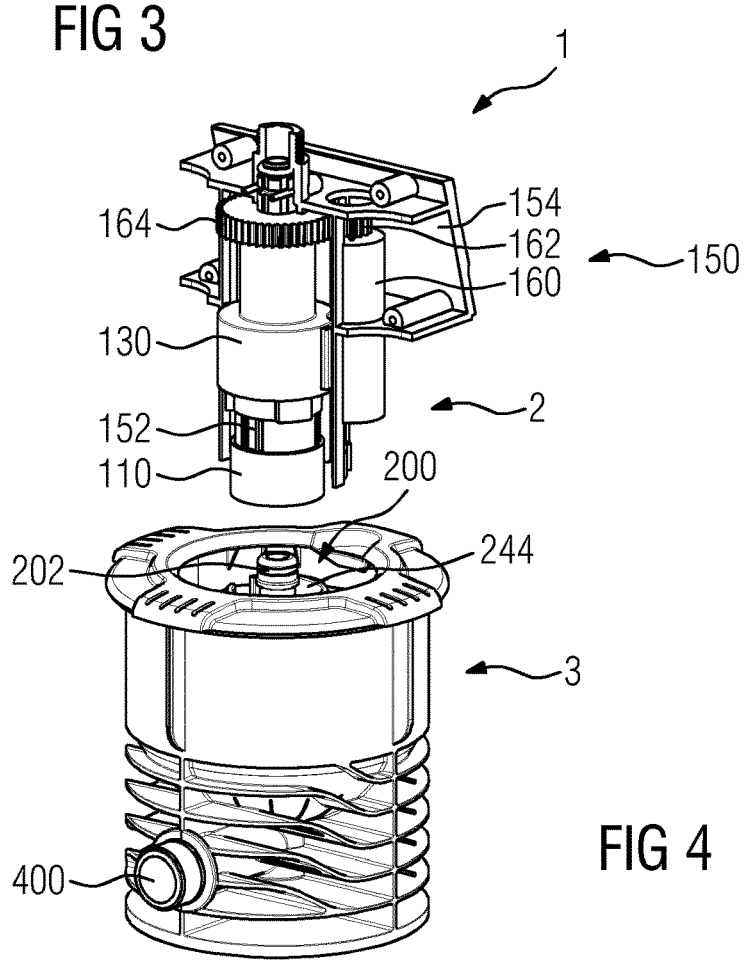
FIG. 3 shows a first view of the system according to the first embodiment in a first position
Figure 4:
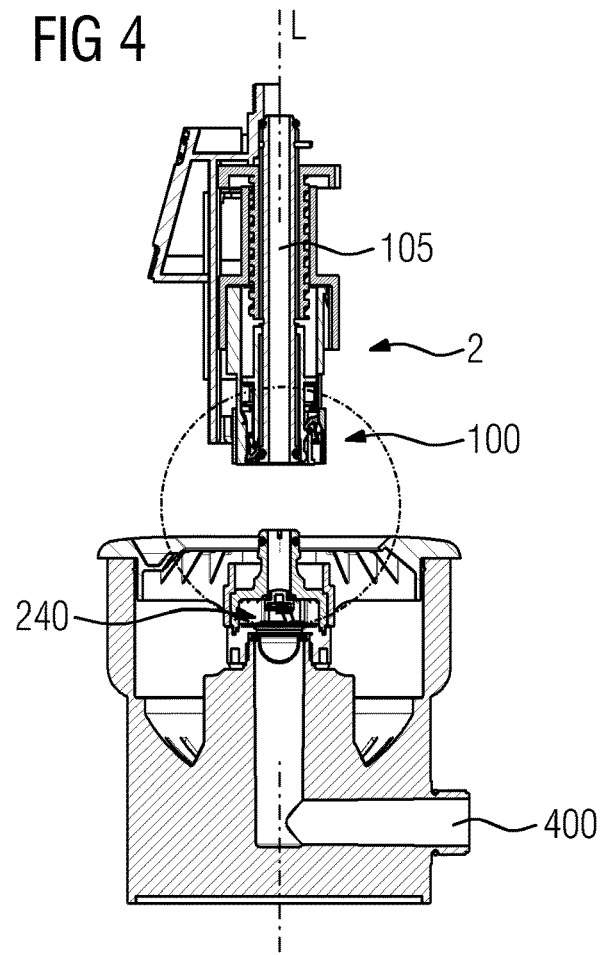
FIG. 4 shows a section of the system according to FIG. 3.

The first position as shown in FIGS. 3 to 5 shows first coupling device 100 and the second coupling device 200 at some distance to each other. Thus, the first position is the starting or end position of the method.

Figure 6:
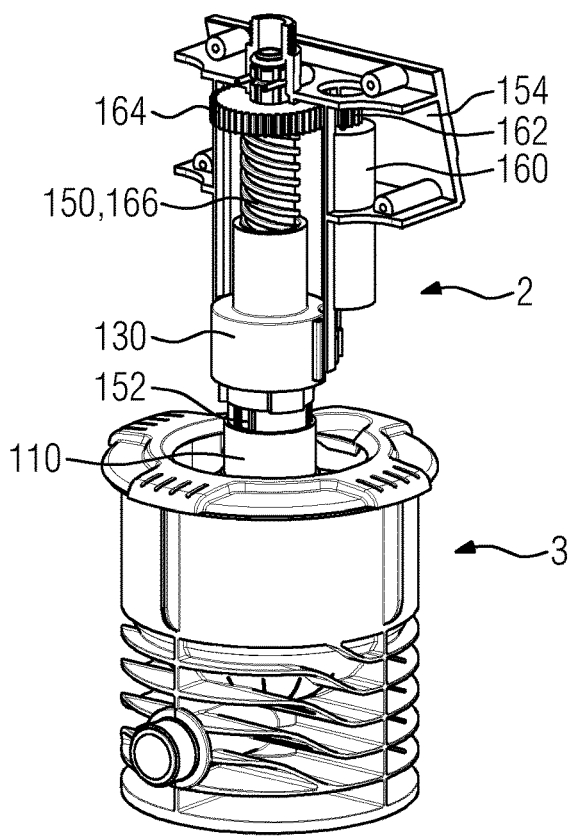
FIG. 6 shows a first view of the system according to the first embodiment in a second position
Figure 7:
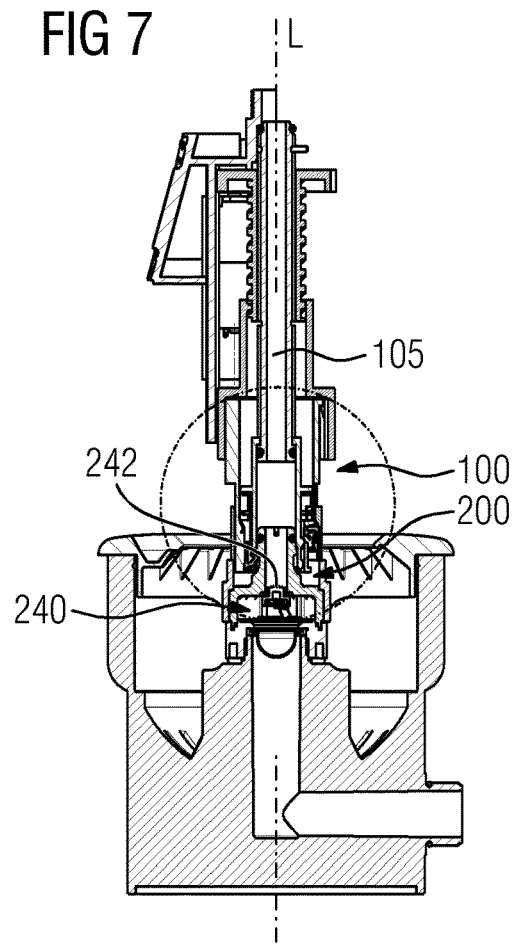
FIG. 7 shows a section of the system according to FIG. 6.
Figure 8:
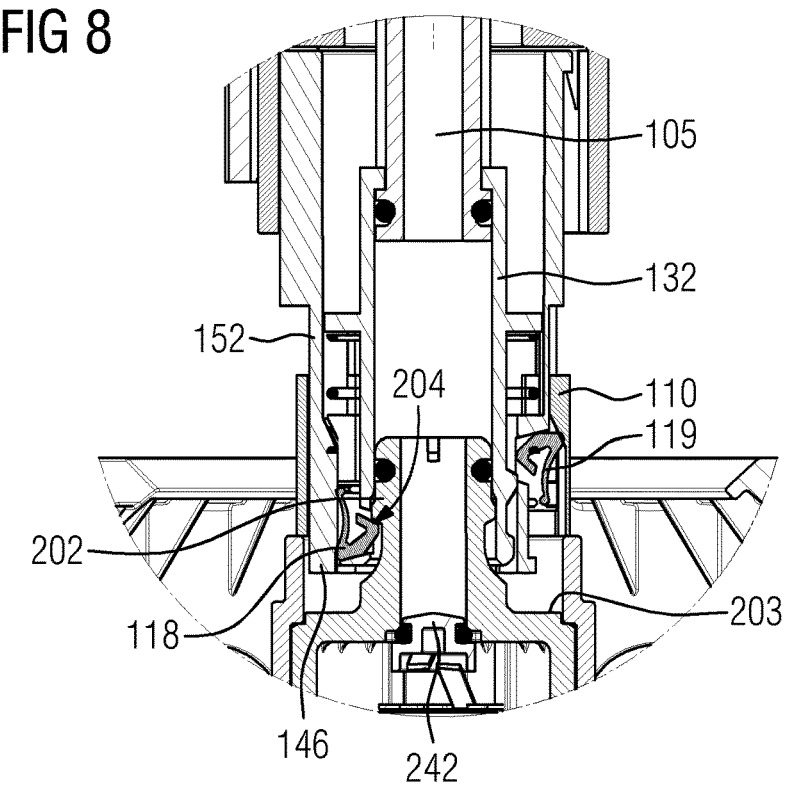
FIG. 8 shows detailed views of the section according to FIG. 6.
Figure 9:
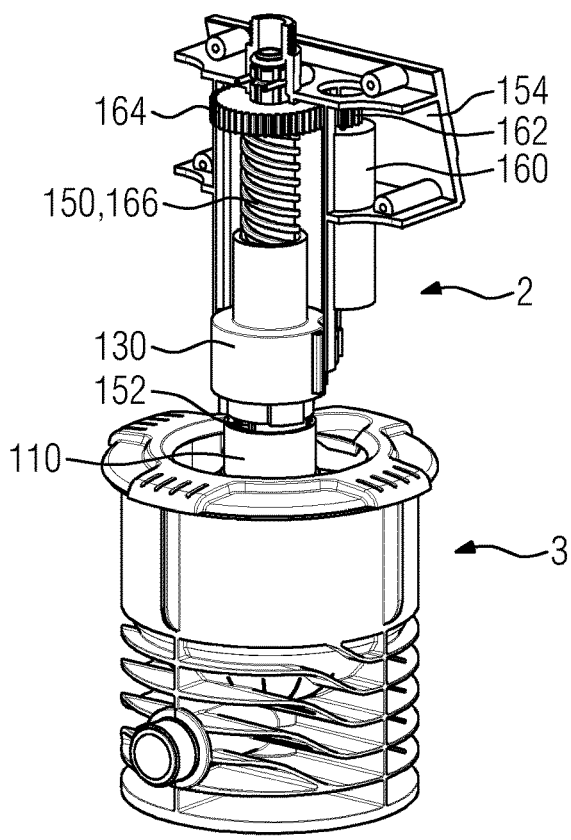
FIG. 9 shows a first view of the system according to the first embodiment in a third position
Figure 10:
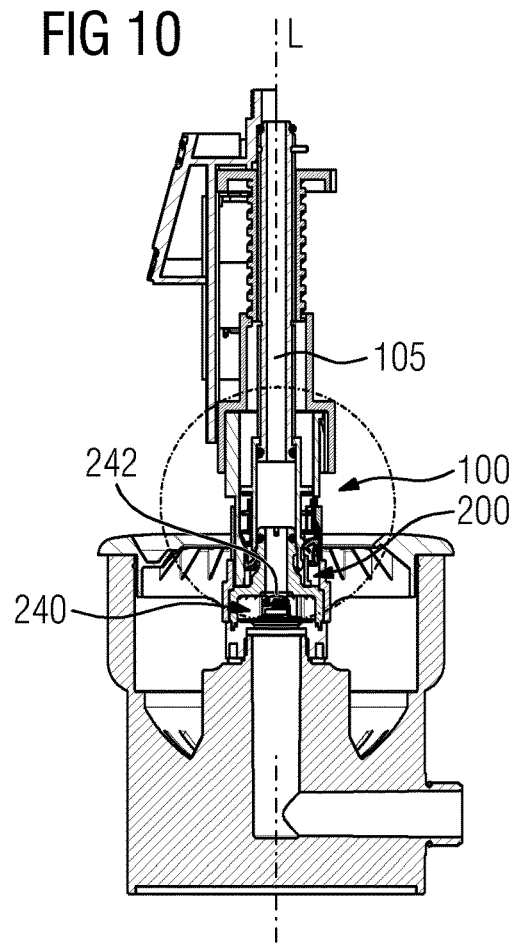
FIG. 10 shows a section of the system according to FIG. 9.
Figure 11:
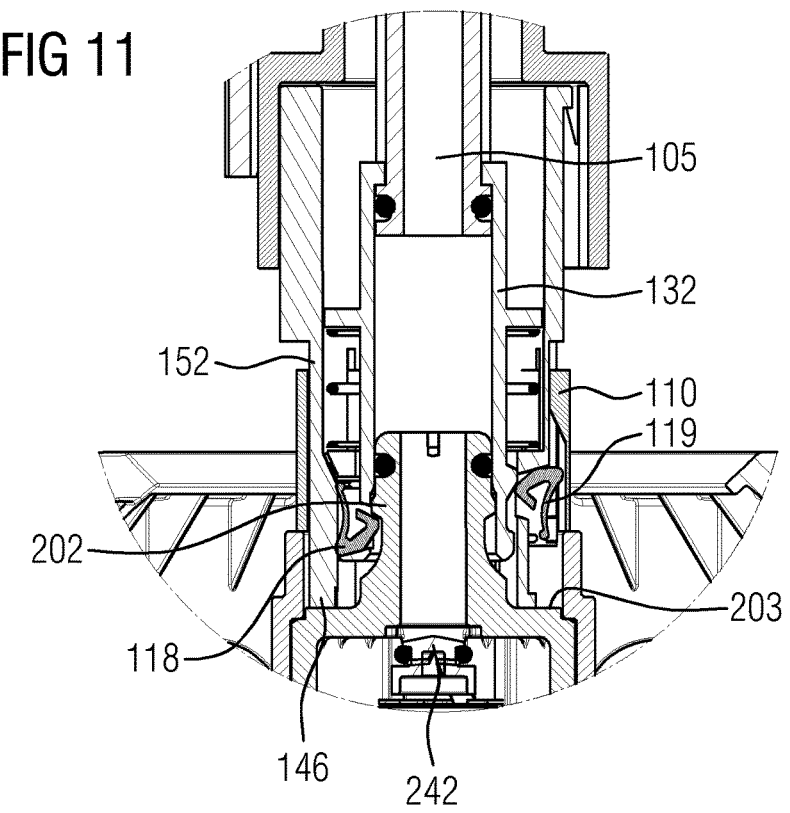
FIG. 11 shows detailed views of the section according to FIG. 9.

The second position as shown in FIGS. 6 to 8 shows first coupling device 100 and the second coupling device 200 in an engaged position, however, a fluid connection is not yet provided. The third position as shown in FIGS. 9 to 11 shows the first coupling device 100 and the second coupling device 200 in engaged and fluid connected state.

Figure 12:
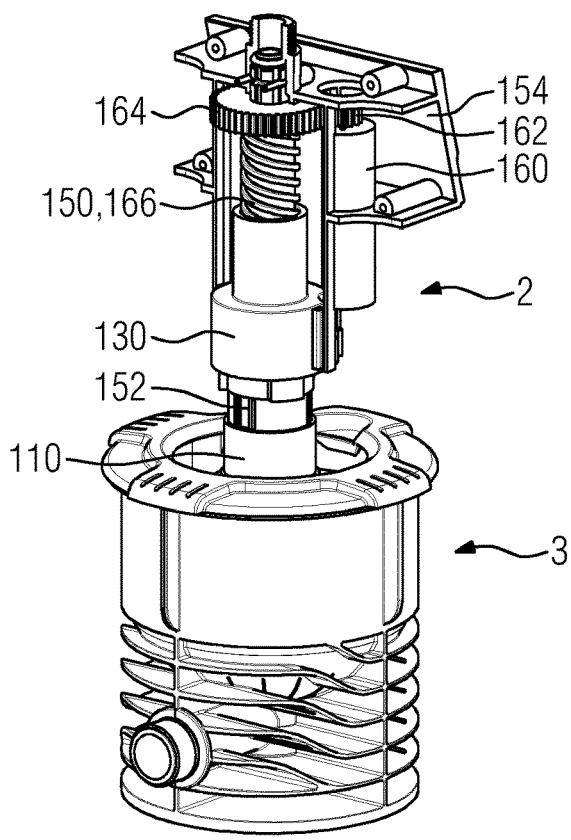
FIG. 12 shows a first view of the system according to the first embodiment in a fourth position
Figure 13:
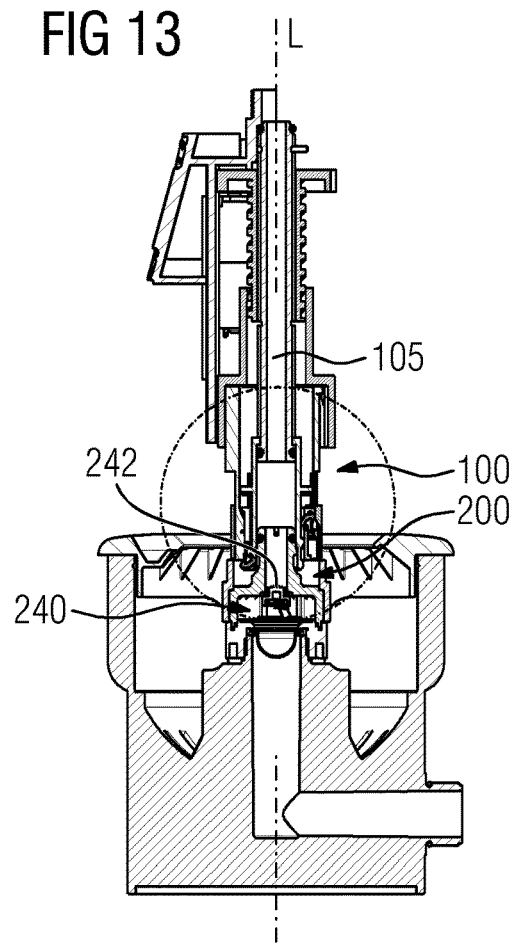
FIG. 13 shows a section of the system according to FIG. 12.
Figure 14:
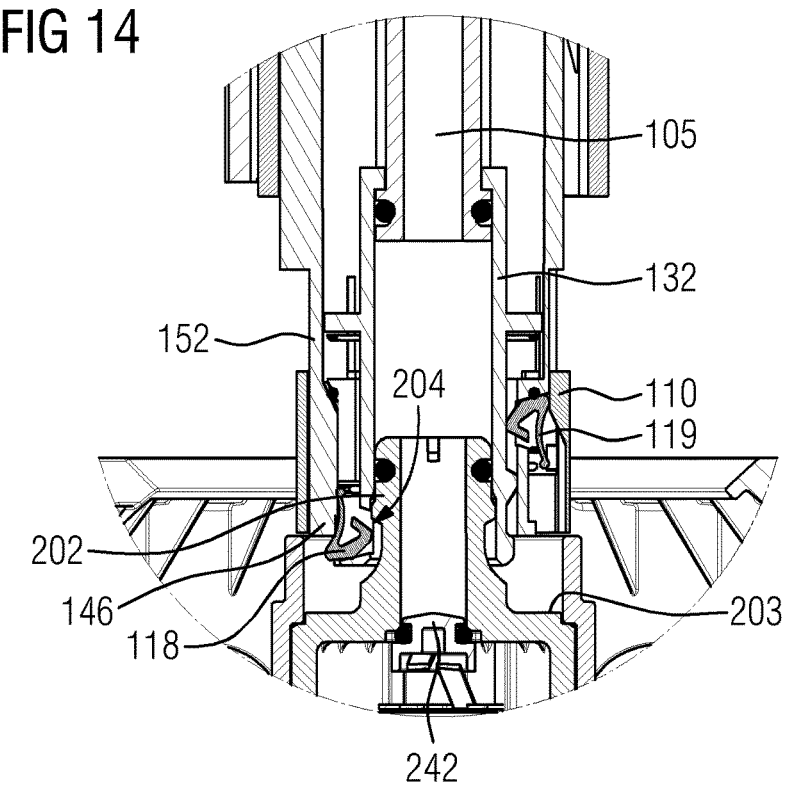
FIG. 14 shows detailed views of the section according to FIG. 12.

The forth position as shown in FIGS. 12 to 14 shows the first coupling device 100 and the second coupling device 200 after the fluid connection has been shut down and the disengagement of the coupling devices is executed.

The first coupling device 100 approaches to the second coupling device 200 by automated approaching the device 2 to the position of the second coupling device 200 to the first position in accordance with step S1.1. In FIG. 3 the first coupling device 100 and the second coupling device, 200 of the system 1 are already aligned. The first coupling device 100 is provided with a securing sleeve 110 and a pinion 150 for moving the securing sleeve 110. In particular central ducts 105, 205 are aligned to each other.

The first coupling device 100 of the device 2 is provided with a securing sleeve 110 and a releasing sleeve 152. The securing sleeve 110 and a releasing sleeve 152 are arranged concentrically around a central duct 105. The securing sleeve 110 and the releasing sleeve 152 are located on a first side of an attachment part 154, being formed a cover part of an irrigation device. On another side of the attachment part 154, a motor 160 is located driving a pinion gear 162. The pinion gear 162 engages a gear 164 connected with a spindle 166 of the pinion 150. The spindle 166 is engaged with the securing sleeve 110 and a releasing sleeve 152 for advancing and retracting the sleeves. In the embodiment of FIG. 3, an optional pressing sleeve 130 being arranged around the spindle above the securing sleeve and the releasing sleeve 152 is shown as well.

The water supply 3 is provided with a second coupling device 200 having a nipple 202 and a central duct 205. The water supply may be, as shown, provided as ground water socket S, with a water inlet sub terrain. However, the water supply 3 may be arranged with a different design and might be placed above ground.

The nipple 202 is provided with an engagement surface 204 And might be provided with a sealing element 203 being a sealing ring. Furthermore the second coupling device 200 is provided with a valve opening member 244, for opening or closing the valve inside the second coupling device 200. The valve 240 is provided with a sealing cone for opening and closing the central duct 205. The valve opening member might be arranged on a flange surface 206 extending around the nipple 202. The valve opening member 244 is provided in the shown example as pin mechanically opening the valve 240.

Figure 5A:
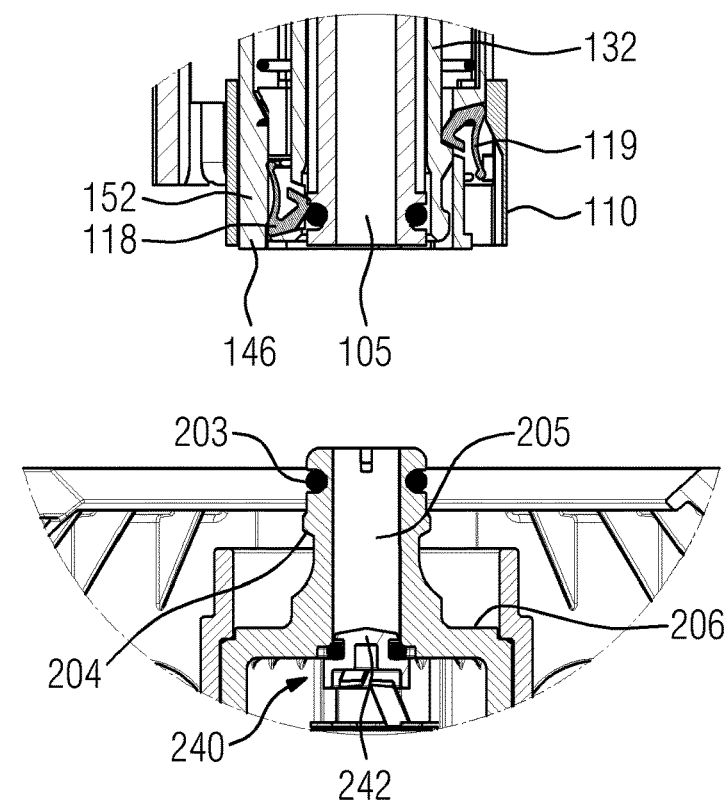
FIG. 5a shows detailed views of the section according to FIG. 3.
Figure 5B:
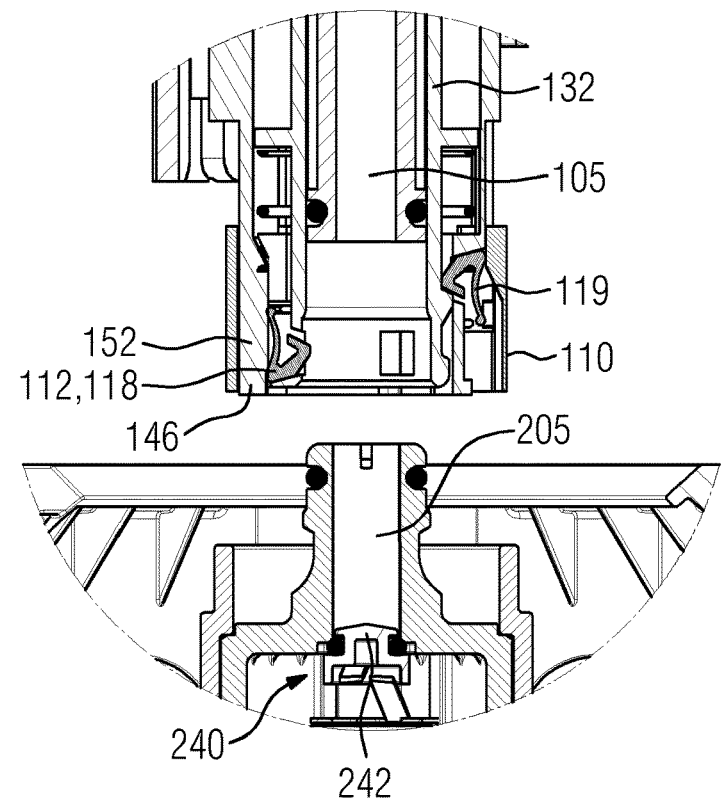
FIG. 5b shows detailed views of the section according to FIG. 3 with an alternative end section of the first coupling device.

At the end of the coupling element 100, which is directed towards the water supply 3, there is further arranged an engagement claw 118 for engaging with the engagement surface 204 of the nipple 202, as shown in FIG. 5a. The engagement claw 118 is coupled to the releasing sleeve 152. In this embodiment a second engagement claw 119 is provided. The second engagement claw 119 is connected with the securing sleeve 110 and may engage with the releasing sleeve 152. Both the engagement claw 118 and the second engagement claw 119 are spring loaded such that their remain or return to a non-engaged position, if not secured. A front side of the releasing sleeve 152 is provided as ring shaped valve opening element 146. In FIG. 5a a liner 132 is provided surrounding the central duct 105. The liner 132 might end directly with the central duct 105 or might protrude the central duct as shown in FIG. 5b.

For coupling the first coupling device with the second coupling device, the nipple 202 of the second coupling device 200 is inserted into a sleeve of the other of the first in accordance with step S1.2 an coupling device. In the present embodiment, the nipple 202 is not moved, but the securing sleeve 110 and the releasing sleeve 152 are driven with the pinion 150, in particular the spindle 166 driven by the motor 160. The spindle 166 is functionally engaged to the releasing sleeve 152, which is on its turn connected with the securing sleeve 110 via a second engagement claw 119.

When driving the securing sleeve 110 and the releasing sleeve 152 over the nipple, the engagement claw 118 moves along an outer surface of the nipple 202 and engages with the engagement surface 204 surrounding the nipple 202. Thus according to step S1.3, the engaging an engagement device 112, comprising the engagement claw 118 of the first coupling device 100 with an engagement surface 204 of the other of the second coupling device 200. The state after the engagement is shown in FIGS. 6 to 8. The seal cone 242 of the valve 240 is in a closed state closing the central duct 205 of the second coupling device 200.

Next, the valve is opened in accordance with Step S1.4. The opened state is shown in FIGS. 9 to 12.

The releasing sleeve 152 is moved further towards the second coupling device 200. A front side of the releasing sleeve 152 forms the valve opening element 146, which presses against the valve opening member 244, located at the second coupling device 200. A shown in the cross section the seal cone 242 of the valve 240 is pushed downwards for opening the valve and a fluid connection between the first coupling device 100 and the second coupling device 200 is build up. Furthermore, the securing sleeve 110 is not is not any more engaged with the releasing sleeve 152 but the second engagement claw 119 is disengaged.

FIGS. 12 to 14 show the beginning of the decoupling. The releasing sleeve 152 is moved back such that the releasing ring 152 does not push any more against the valve opening member 244 and the valve 240 with the seal cone is closed again. The second engagement claw 119 engages again with the securing sleeve 110.

For returning to the state as shown in FIGS. 3 to 5, the securing sleeve 110 is retracted by means of the retracting sleeve 152 for such a distance that the engagement claw 118 is not any more secured but disengages from the engagement surface 204. Thus by moving the sleeves 110, 152 up with the spindle 166, the sleeves 110, 152 may now be retracted from the nipple 204 and the first 100 and the second coupling device 200 may be brought into a distant position from each other.

Figure 15:
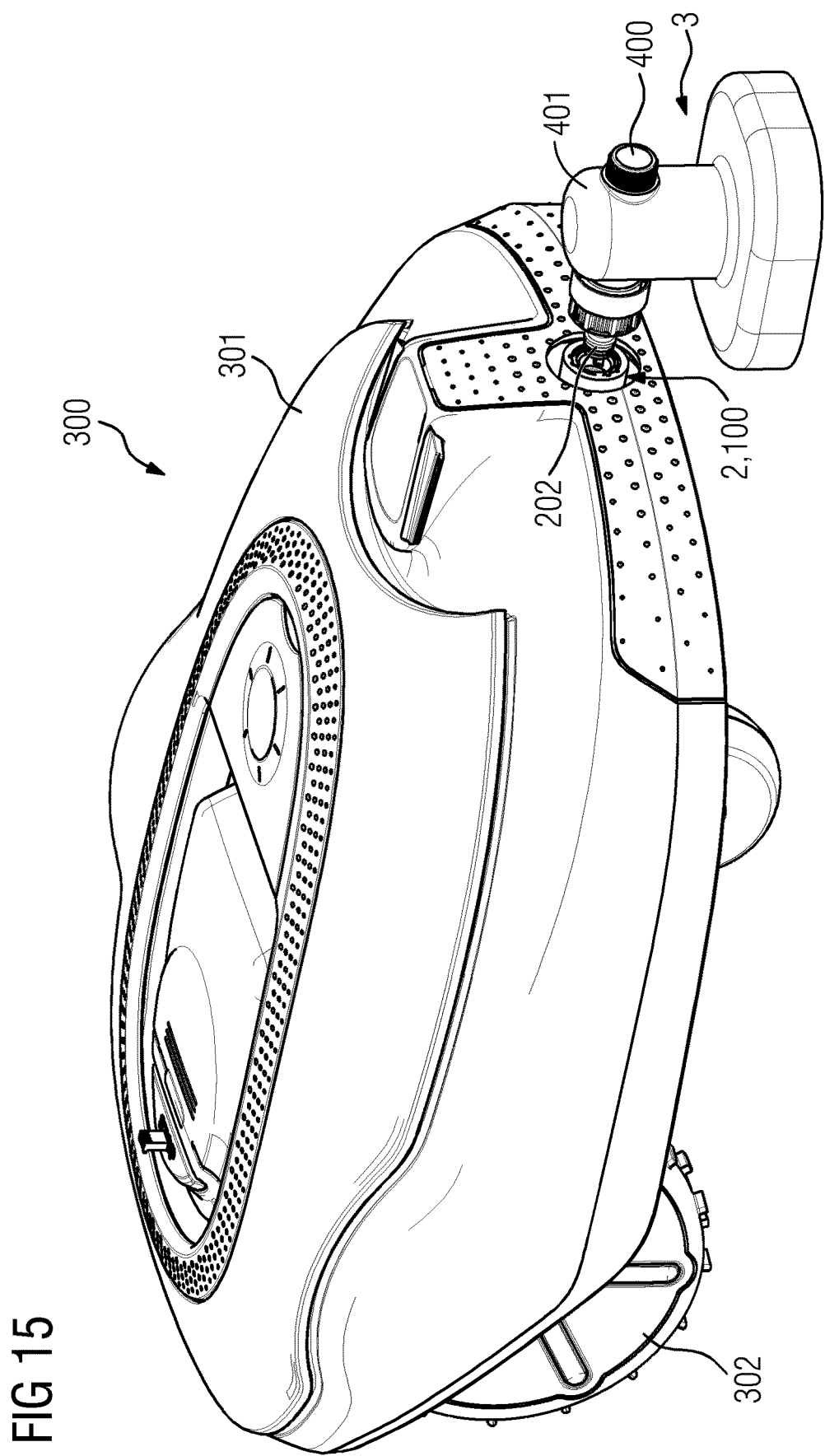
FIG. 15 shows an irrigation robot according to the second embodiment in a first view.

FIG. 15 shows an irrigation robot 300 according to a second embodiment. The irrigation robot is a self-driving device having a body 301 and wheels 302. In particular, the irrigation robot 300 is provided with two larger drive-wheels and two smaller auxiliary wheels. However, a different wheel configuration is possible as well. The irrigation robot 300 is provided as device 2 having a first coupling device 100 for coupling a water supply 3 having a second coupling device 200. The device 2 is located at a front side of the irrigation robot 300. However, it might be as well located at the opposite side. The device 2 is provided with a sleeve having a horizontal longitudinal axis. The water supply 3 in provided with a body 401 fixing the position and the direction of the second coupling device 200. In particular, first coupling device 100 and second coupling device 200 have the same height h from the ground. The body 401 is dedicated as stand-alone device on a ground. A water inlet 401 is provided on the opposite side as the second coupling device 200. The height of the water inlet 401 is not limited to the shown configuration.

FIGS. 16 to 23 show a system 1 comprising a device 2 and a water supply 3, wherein the first coupling device 100 may be included in the irrigation robot as shown in FIG. 15. The device 2 comprises a first coupling device 100 being provided a female connector with a securing sleeve 110 while the water supply 3 is provided as male connector, the second coupling device 200 is provided with a nipple 202.

Figure 16:
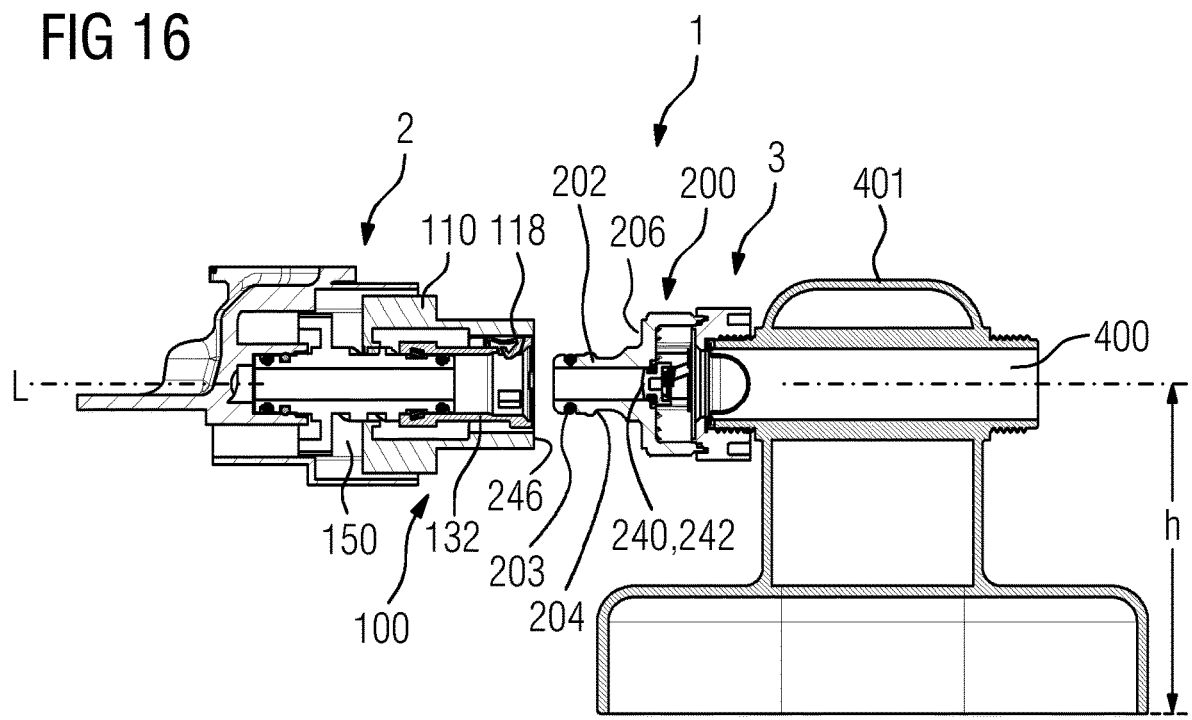
FIG. 16 shows a first section view of the system according to the second embodiment in a first position.
Figure 17:
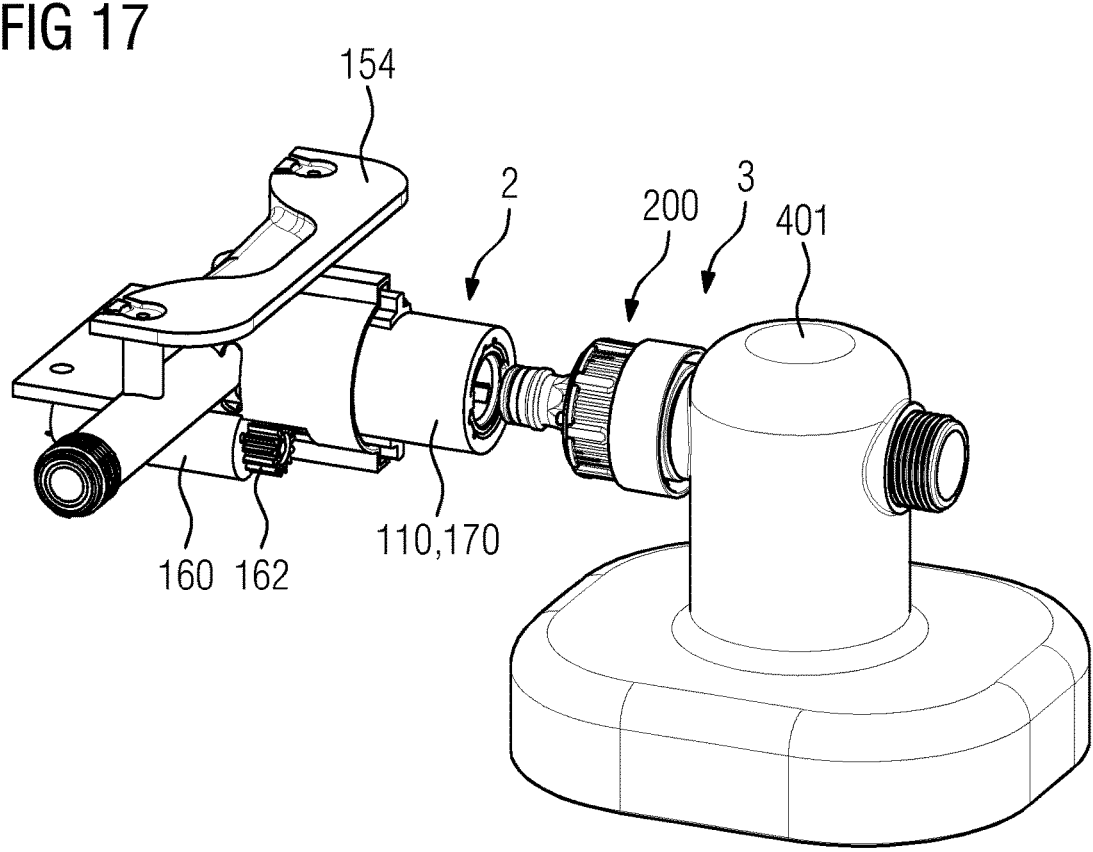
FIG. 17 shows a second view of the system according to the second embodiment in a first position.

FIGS. 16 and 17 show the system 1 in a first uncoupled state, where the first coupling device and the second coupling device are aligned with their respective ducts.

Figure 18:
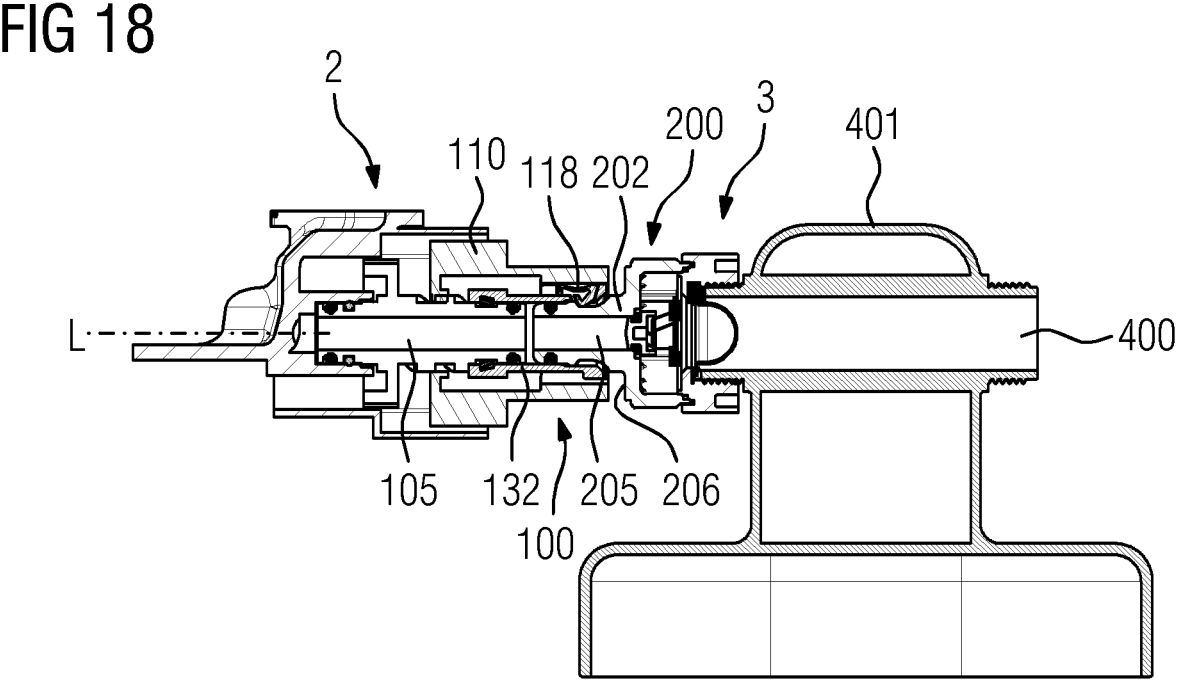
FIG. 18 shows a first section view of the system according to the second embodiment in a second position.
Figure 19:
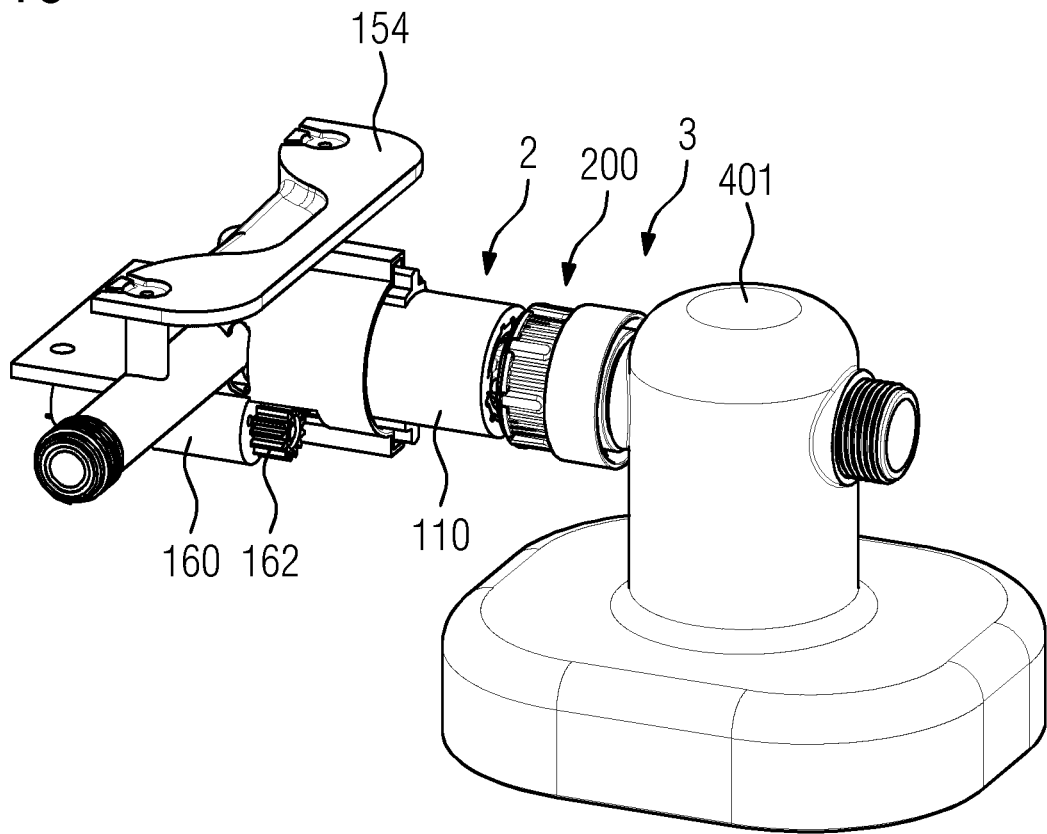
FIG. 19 shows a second view of the system according to the second embodiment in a second position.

FIGS. 18 and 19 show the system 1, wherein the nipple is already inserted and the coupling devices are engaged with each other.

Figure 20:
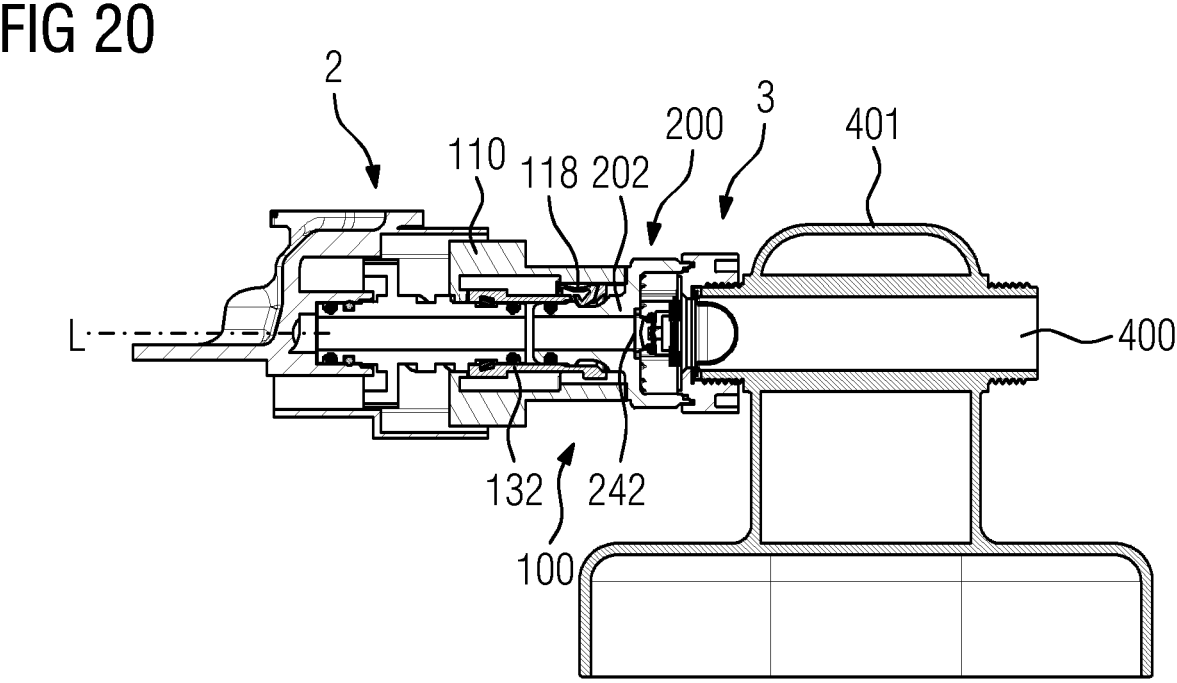
FIG. 20 shows a first section view of the system according to the second embodiment in a third position.
Figure 21:
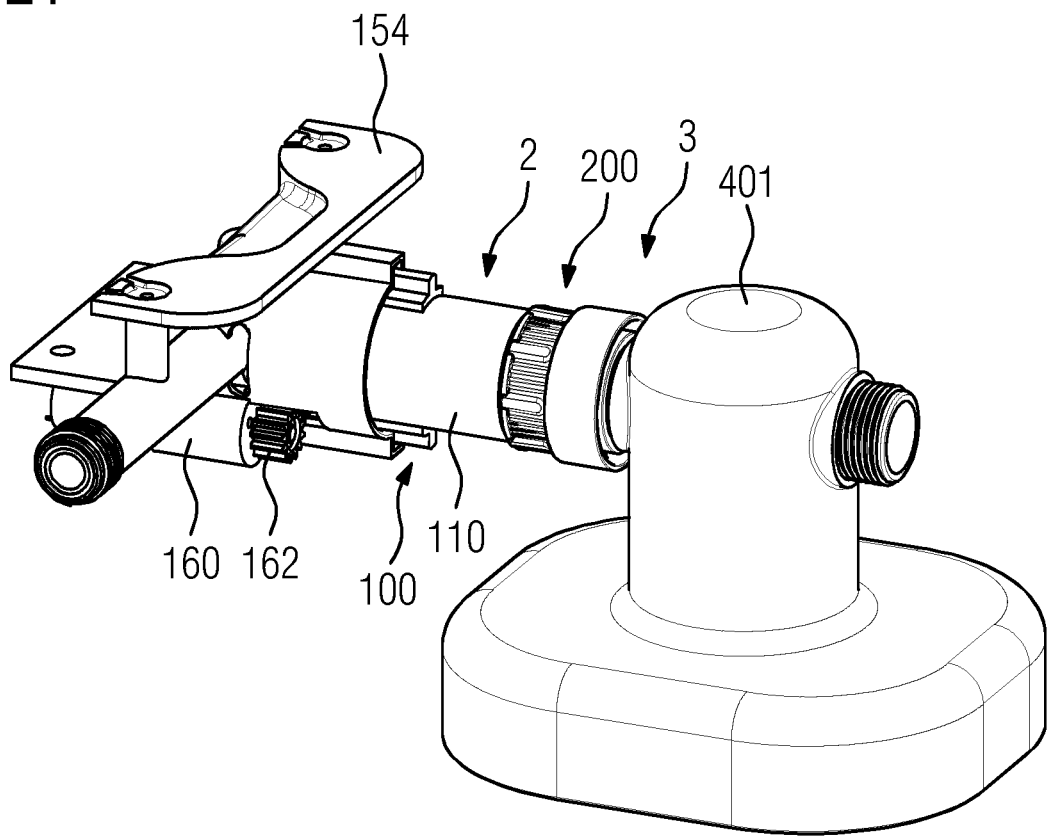
FIG. 21 shows a second view of the system according to the second embodiment in a third position.

FIGS. 20 and 21 show the system 1 with an opened valve, such that the water inlet is in fluid connection with the device.

Figure 22:
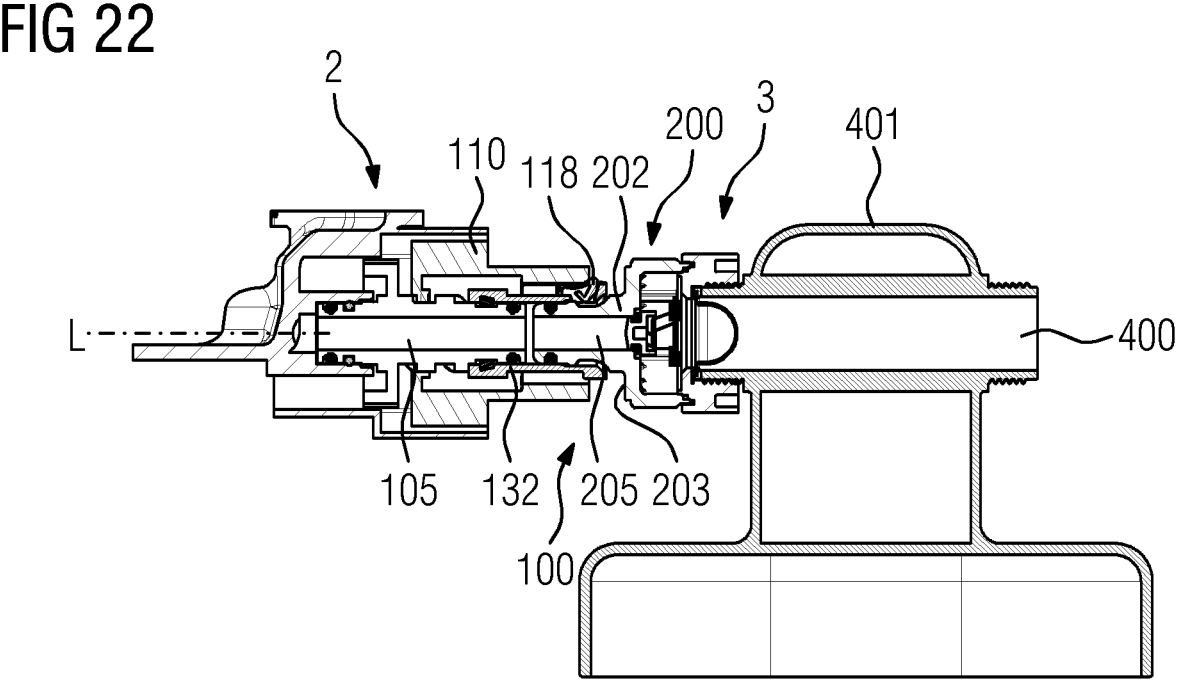
FIG. 22 shows a first section view of the system according to the second embodiment in a fourth position.
Figure 23:
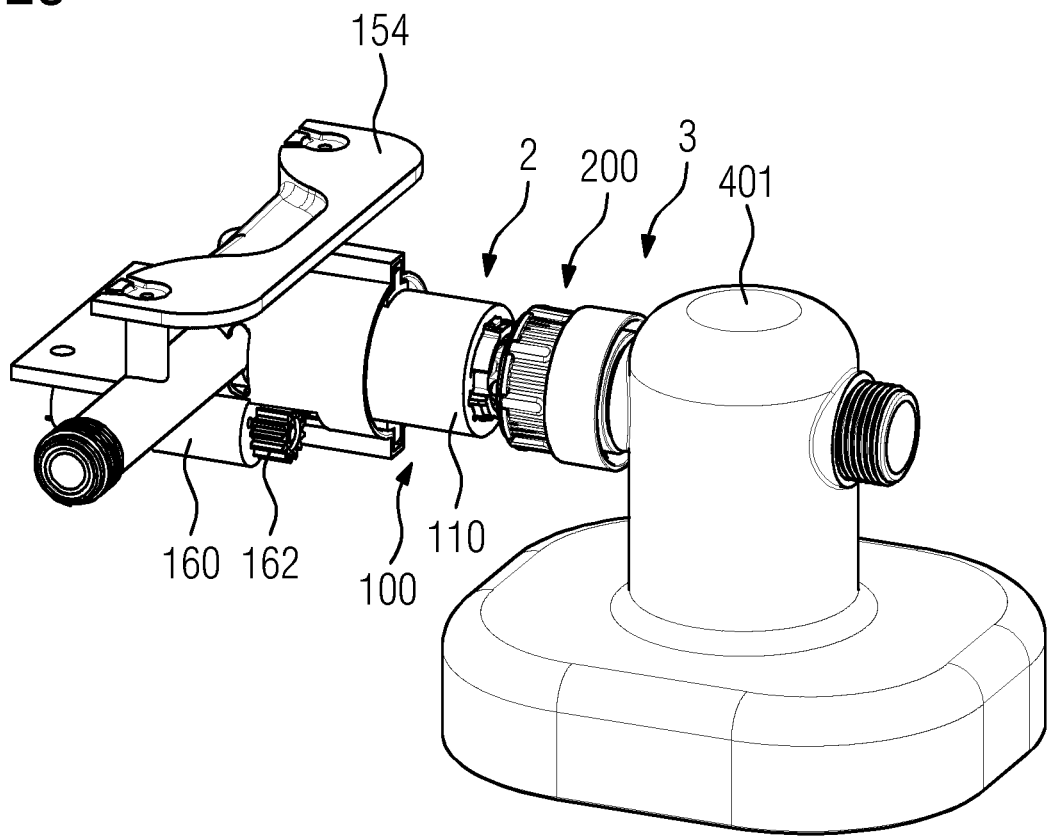
FIG. 23 shows a second view of the system according to the second embodiment in a fourth position.

FIGS. 22 and 23 show the system 1 while disconnecting the first coupling device 100 from the second coupling device 200. The valve is closed.

The first coupling device 100 is approached to the second coupling device 200 by approaching the device 2 to the position of the second coupling device 200. FIG. 16 shows a cross-section of the system as shown in gig. 17. The first coupling device 100 is provided with a central duct 105, which is surrounded with the securing sleeve 110. In this embodiment no separate releasing sleeve is provided, such that the securing sleeve is a single sleeve 170. An engagement claw 118 is shown which is not engaged. The engagement claw 118 is spring loaded such that it remains or returns to a non-engaged position, if not secured. The engagement claw 118 is connected to the securing sleeve 110. The device 2 is further provide with a pinion 150 and a motor 160 for controlling a position of the securing sleeve 110. The pinion 150 is dedicated for moving the securing sleeve 110 along the longitudinal axis L towards or away from an attachment part 154. The second coupling device 200 is provided with a nipple having a central duct 205, a valve 240 having a seal cone 242 for closing the central duct 205 of the second coupling device 200. In a tip area, the nipple 202 is provided with a sealing ring 203. The nipple 202 is further provided with an engagement surface 204.

FIGS. 18 and 19 show a next step of the coupling. The nipple 202 is inserted into the into a sleeve, in particular a liner 132 coaxially arranged with the central duct inside the securing sleeve 110, and the securing sleeve 110 of the other of the first coupling device 100. An engagement device 112 comprising the engagement claw 118 of the first coupling device 100 with an engagement surface 204 of the second coupling device 200. The valve 240 is still closed. In particular the device 2 is approached as a complete device but alternatively, the pinion may drive the securing sleeve towards the second coupling device 200. Thus FIGS. 18 and 19 show a position after the completion of step S1.2 and S1.3.

In a next step S1.4) the valve 240, located inside the second coupling device 200, is opened by the front of the securing sleeve 110 being a ring surface arranged with the first coupling device 100, the valve opening element 146 pressing against a valve opening member 244 of the second coupling device 200. The valve opening member may a pin located at the flange surface 206. Thus, by contacting the valve opening element 246, here the front surface of the securing sleeve, with the flange surface 206, the valve opening member 244 is actuated. A fluid connection is build up, as depicted in the FIGS. 20 and 21

The following figures FIGS. 22 and 23 now show the decoupling. In the next step the valve 240, located inside the second coupling device 200, is closed by releasing a valve opening element arranged with the first coupling device, from a valve opening member 244 of the second coupling device 200. The securing sleeve 110 is retracted by means of the pinion 150 and thus is no longer pressing against the valve opening member 246.

The engagement device 112, here the engagement claw 118, of the first coupling device 100 disengages with an engagement surface 204 of the second coupling device 200. The securing sleeve 110 is no longer securing, in particular pressing, the engagement claw 118 to the engagement surface 204 in its retracted state. The securing sleeve may now be completely retracted from the nipple of the second coupling device and a distance between the first coupling device and the second coupling device may now be increased by moving away the device 2.

FIGS. 24 to 31 show a third embodiment of the system 1. In contrast to the above embodiments, the device 2, which may designed as an irrigation robot similar FIG. 15, is provided in this embodiment as male connector and is provided with a nipple 102.

Figure 24:
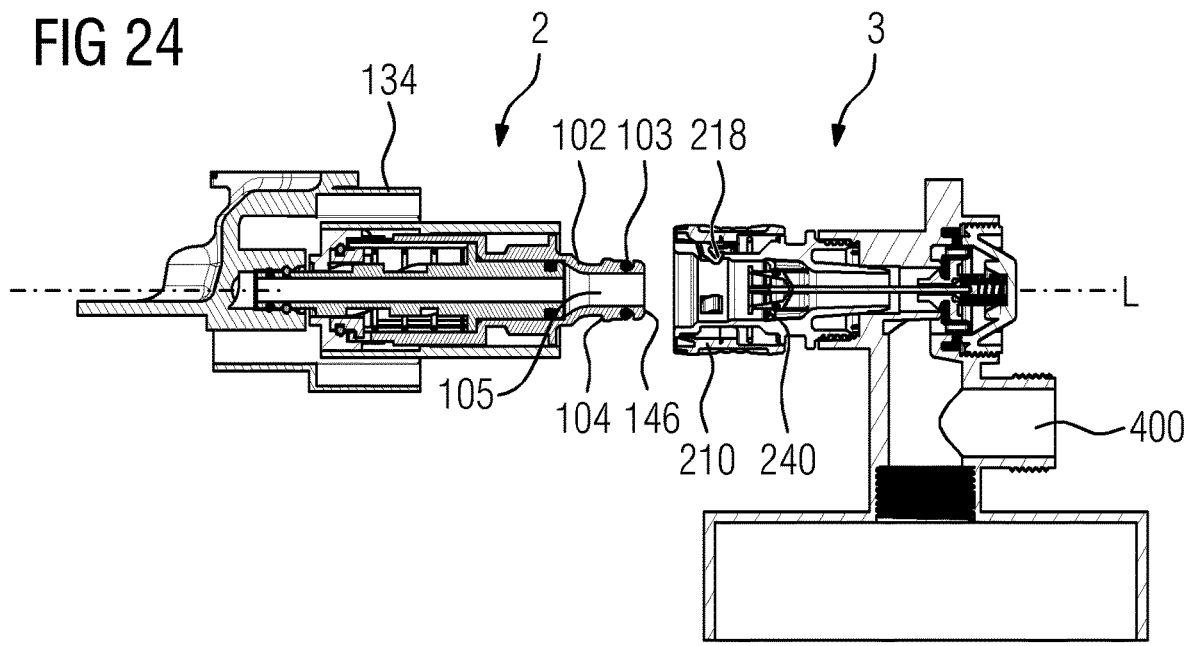
FIG. 24 shows a first section view of the system according to the third embodiment in a first position.
Figure 25:
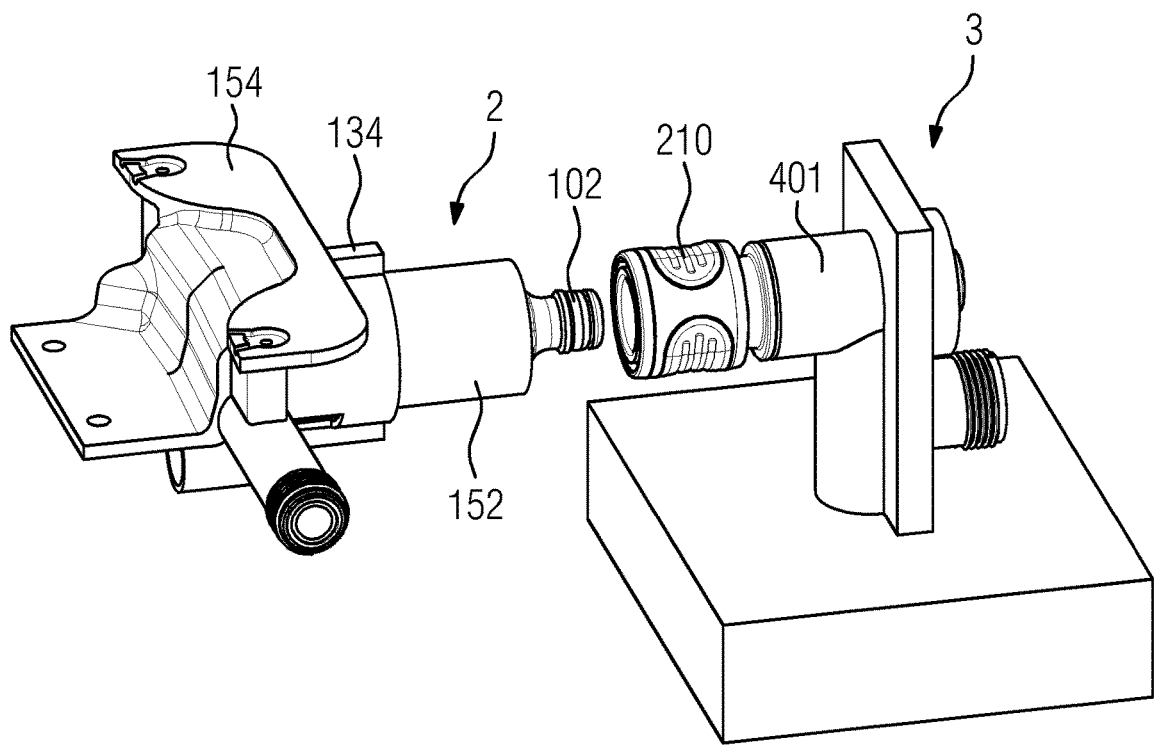
FIG. 25 shows a second view of the system according to the third embodiment in a first position.

FIGS. 24 and 25 show the system 1 in a first uncoupled state, where the first coupling device and the second coupling device are aligned with their respective ducts.

Figure 26:
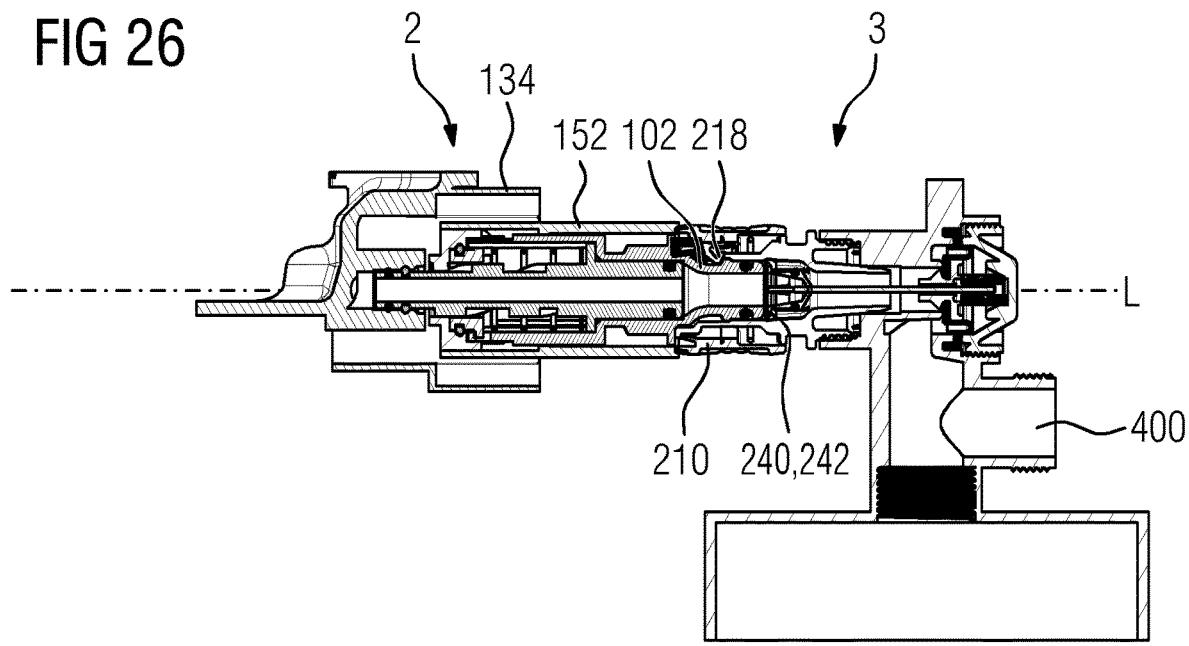
FIG. 26 shows a first section view of the system according to the third embodiment in a second position.
Figure 27:
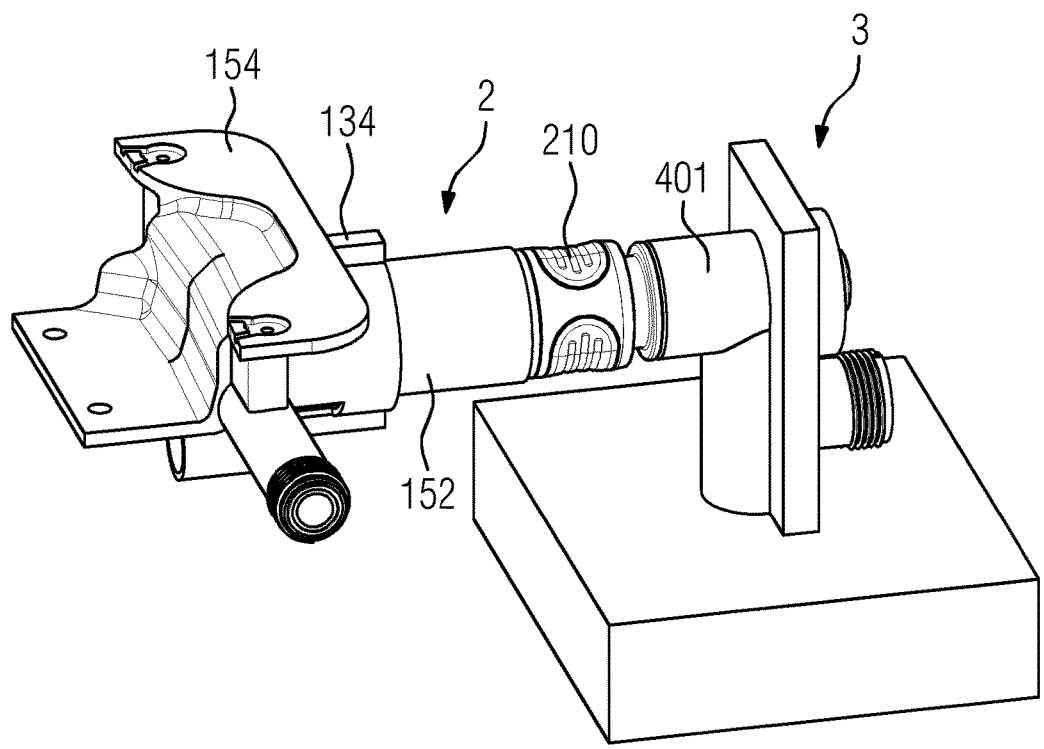
FIG. 27 shows a second view of the system according to the third embodiment in a second position.

FIGS. 26 and 27 show the system 1, wherein the nipple is already inserted and the coupling devices are engaged with each other.

Figure 28:
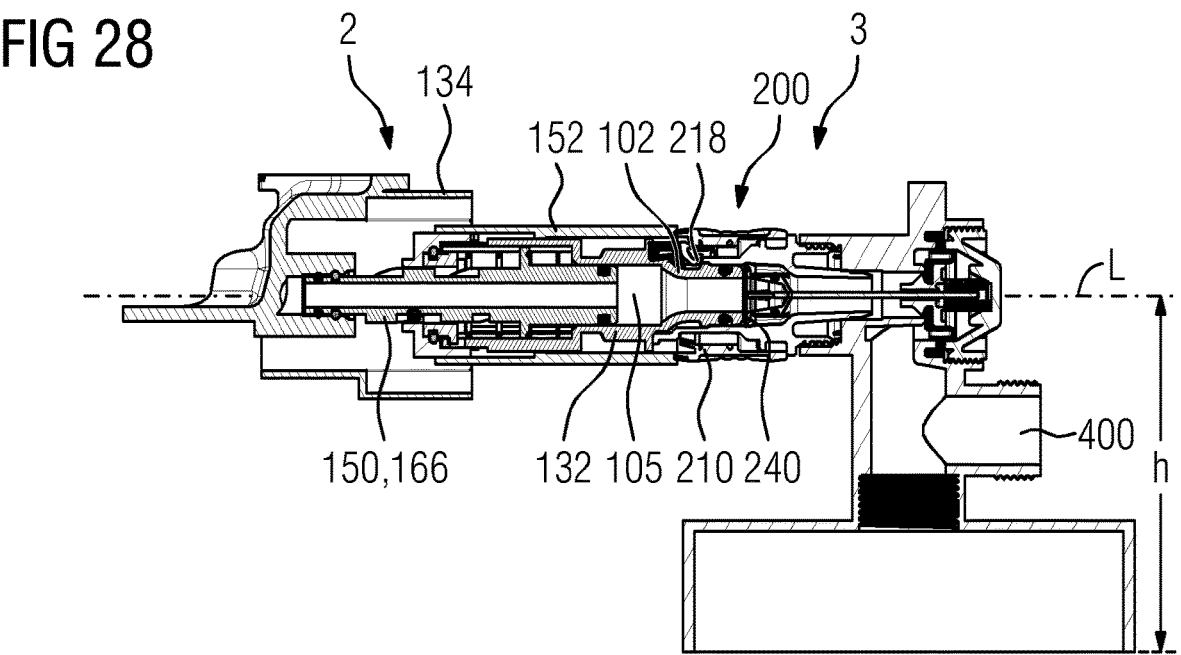
FIG. 28 shows a first section view of the system according to the third embodiment in a third position.
Figure 29:
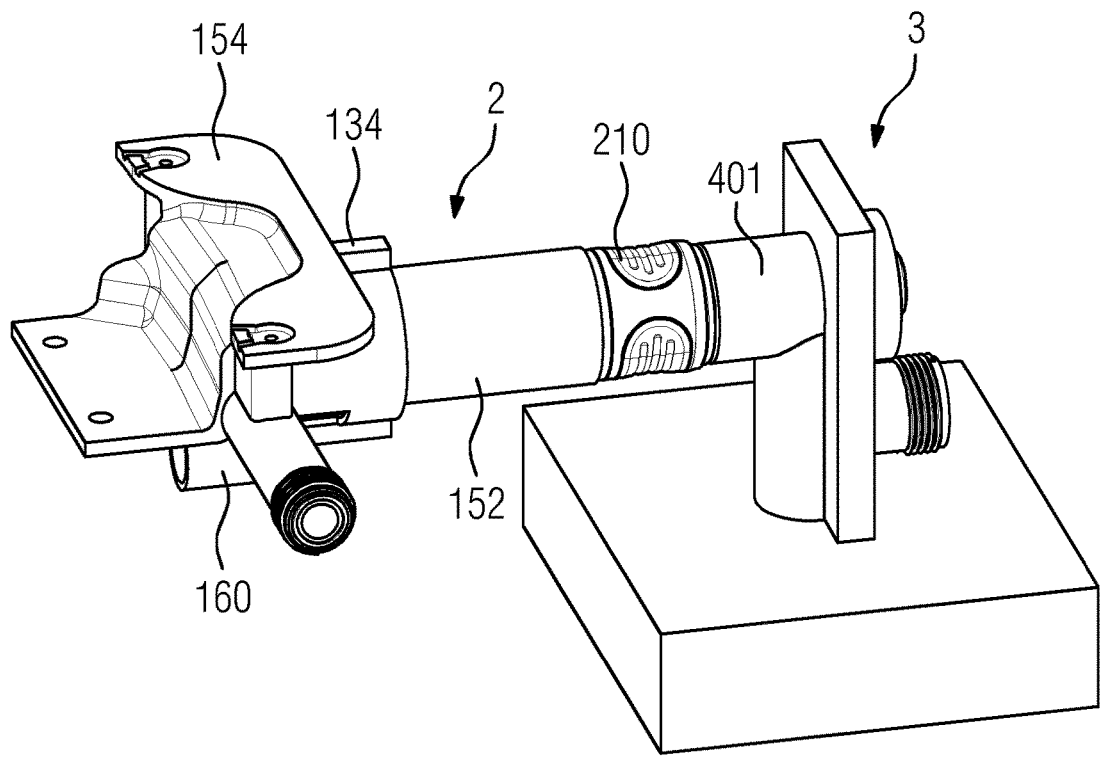
FIG. 29 shows a second view of the system according to the third embodiment in a third position.

FIGS. 28 and 29 show the system 1 with an opened valve, such that the water inlet is in fluid connection with the device.

Figure 30:
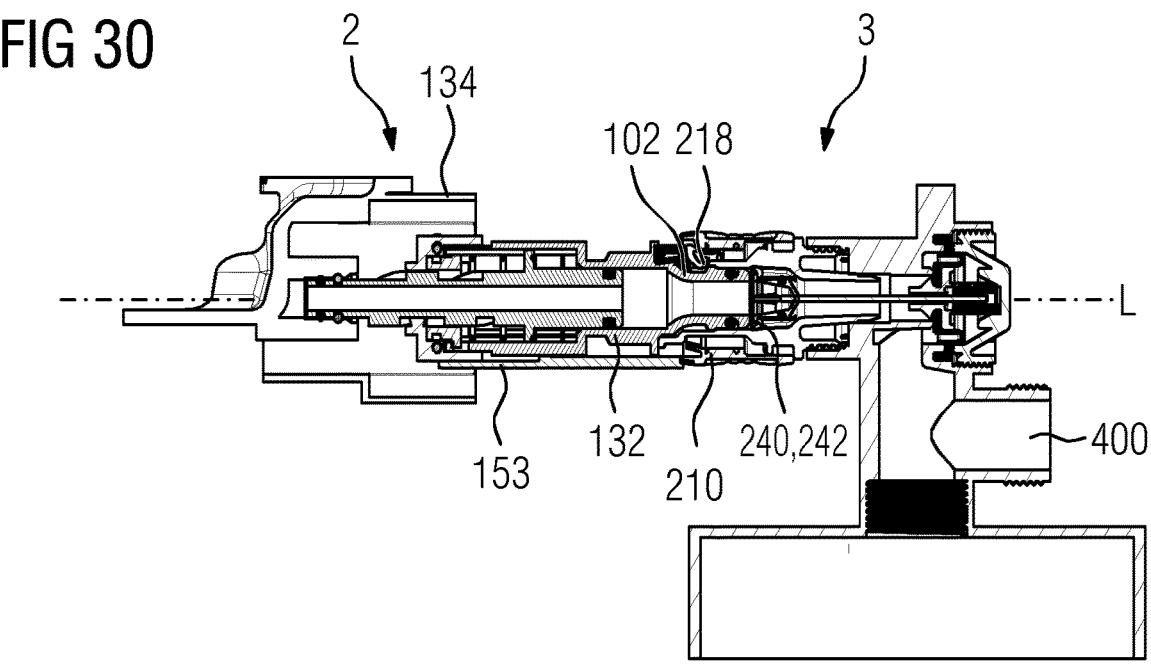
FIG. 30 shows a first section view of the system according to a variant of the third embodiment in a third position.
Figure 31:
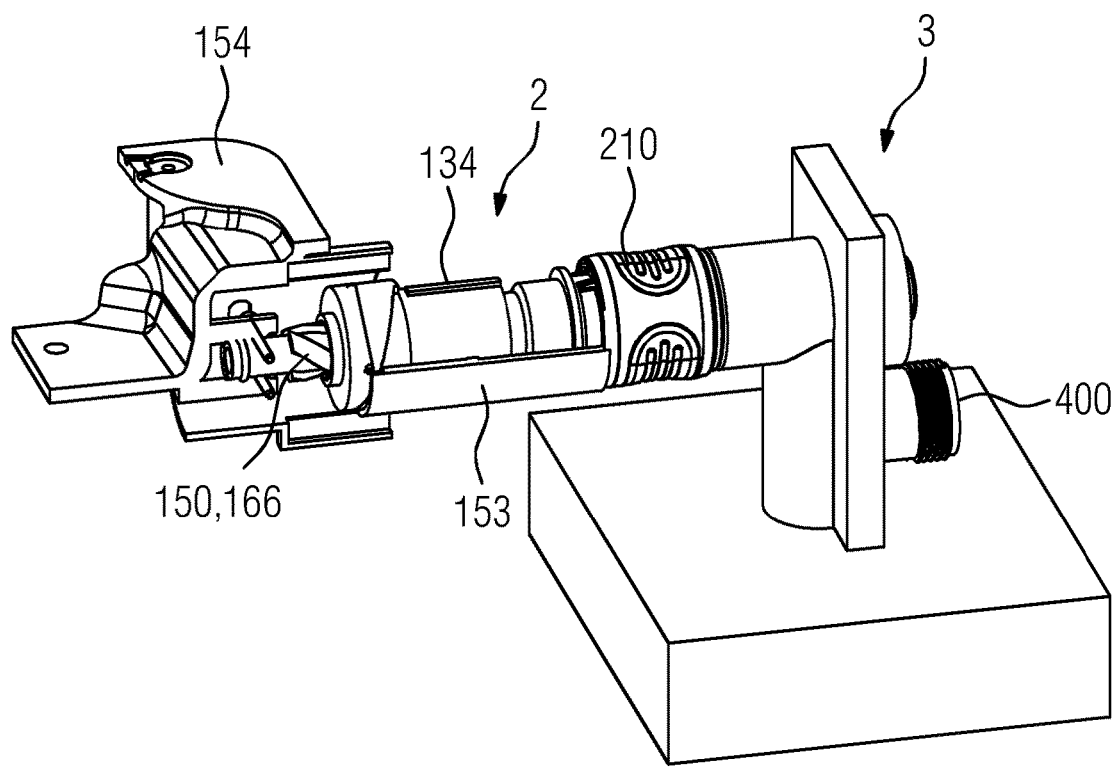
FIG. 31 shows a second view of the system according to the variant of third embodiment in a third position

FIGS. 30 and 31 show the system 1 with an opened valve, such that the water inlet is in fluid connection with the device but with an alternative releasing element instead of a sleeve.

FIG. 24 and FIG. 25 shows the device 2, that is approached to the water supply 3.

The water supply 3 in provided with a body 401 fixing the position and the direction of the second coupling device 200. In particular, first coupling device 100 and second coupling device 200 have the same height h from the ground. The body 401 is dedicated as stand-alone device on a ground. An water inlet 401 is provided on the opposite side as the second coupling device 200. The height of the water inlet 401 is not limited to the shown configuration.

The device 2 is provided with a releasing sleeve 152. The water supply 3 is provided with a securing sleeve 210. FIG. 26 and FIG. 27 shows that the nipple 102 of the first coupling device 100 is inserted into the securing sleeve 210 of the second coupling device 200. The insertion is actuated by approaching the device 2 towards the water supply 3. The valve 240 of the second coupling device 200 is similar to the ones shown in the previous figures. However, in this embodiment the valve opening element 146 is the tip of the nipple 102 pushing a valve cone open. Thus, as soon as the nipple 102 is fully inserted the valve 240 is opened. An engagement claw 218 is in this embodiment provided with the second coupling device 200 at the water supply 3. When the nipple 102 is fully inserted, the engagement claw 218 engages with the engagement surface 104. The nipple 102 is further provided with a sealing element 103.

FIG. 28 and FIG. 29 shows a the decoupling of the first coupling device 100 and the second coupling device 200. The releasing sleeve 152 is driven with the pinion 150 towards the second coupling device 200, meaning out of the outer sleeve 134, which surrounds the releasing sleeve 152 and is connected with the attachment part 154. The cross-section of the device shows the central duct 105 surrounded by the releasing sleeve 152. The nipple 102 is provided with an engagement surface 104. The second coupling device 200 is provided with a central duct 205 the securing sleeve 210 and an engagement claw 218. The engagement claw 218 is spring loaded such that it remains or returns to a non-engaged position, if not secured. The releasing sleeve 152 may push the securing sleeve 210 in a direction towards the water supply 3. When the securing sleeve 210 is pushed back from a securing position to a releasing position, the engagement hook 218 is disengaged and by moving the device away from the water supply the nipple may be retracted and device 2 and water supply may be separated.

FIGS. 30 and 31 show an alternative embodiment to the one as shown in FIGS. 28 and 29. The first coupling element 100 is provided with a releasing element 153 being not a sleeve instead of the releasing sleeve 152. The releasing element 153 is arranged outside the outer sleeve 134 and extends along the outer sleeve 134. However, the function of the releasing element 153 remains the same.

LIST OF REFERENCE NUMERALS

1 System
2 Device
3 Water Supply
100 first coupling device
102 nipple
103 sealing
104 engagement surface
105 central duct
110 securing sleeve
112 engagement device
116 spring element
118 engagement claw
119 second engagement claw
130 pressing sleeve
132 liner
134 outer sleeve
146 valve opening element
150 pinion
152 releasing sleeve
153 releasing element
154 attachment part
160 motor
164 gear
166 spindle
170 single sleeve
200 second coupling device
202 nipple
203 sealing
204 engagement surface
205 central duct
210 securing sleeve
212 engagement device
218 engagement claw
240 valve
242 seal cone
244 valve opening member
246 valve opening element
300 irrigation robot
301 body
302 wheel
310 ground
400 water inlet
401 body
L longitudinal axis
H height
S Socket

The invention claimed is:

1. A method for automated coupling an autonomously navigating self-driving device to a water supply and decoupling the device from the water supply,
wherein the device is provided with a body and has a first coupling device operably coupled to the body and having a central duct, wherein
the water supply is provided with a second coupling device having a central duct and a valve for opening and closing the central duct,
the method for coupling comprising
S1.1) approaching the first coupling device to the second coupling device by automated approaching the device to a position of the second coupling device,
S1.2) inserting a nipple of the second coupling device into a sleeve of the first coupling device by driving the first coupling device relative to the body in a direction towards the second coupling device,
S1.3) engaging an engagement device of the first or second coupling device with an engagement surface of the other of the first or second coupling device, S1.4) opening the valve, located inside the second coupling device, by a valve opening element arranged with the first coupling device, the valve opening element pressing against a valve opening member of the second coupling device;

and the method for decoupling comprising,

S2.1) closing the valve, located inside the second coupling device, by releasing a valve opening element arranged with the first coupling device, from a valve opening member of the second coupling device, S2.2) disengaging the engagement device of the first or second coupling device from the engagement surface of the other of the first or second coupling device, S2.3) retracting the nipple of the second coupling device from the sleeve of the first coupling device by driving the first coupling device relative to the body in a direction away from the second coupling device, and S2.4) distancing the first coupling device from the second coupling device by moving away from the device.

2. The method according to claim 1, wherein step S1.2 comprises moving a securing sleeve of the first coupling device towards the second coupling device into a securing position and/or wherein step 1.2 comprises driving the first coupling device away from the body, and/or wherein step 2.3 comprises driving the first coupling device towards the body, and/or wherein step 1.2 comprises driving a motor operably coupled to the first coupling device to cause the first coupling device to move relative to the body in a direction towards the second coupling device and/or wherein step 2.3 comprises driving the motor operably coupled to the first coupling device to cause the first coupling device to move relative to the body in a direction away from the second coupling device.

3. The method according to claim 1, wherein S2.2 comprises moving a securing sleeve of the engagement device in an extension direction of the nipple for disengaging an engagement claw engaging with the engagement surface.

4. The method according to claim 3, wherein the securing sleeve is pushed in the extension direction of the nipple by a releasing element.

5. The method according to claim 3, wherein the securing sleeve is retracted in the extension direction by a pinion provided with the first coupling device.

6. The method according to claim 1, wherein for step S1.1 and S1.2 the device is moved towards the second coupling device by a horizontal movement, and wherein for step S2.3 and step 2.4 the device is moved away from the second coupling device by a horizontal movement of the device.

7. A device comprising a first coupling device having a central duct for coupling a second coupling device attachable to a water supply, the second coupling device comprising a valve and has a central duct, wherein the first coupling device comprises a pinion and a releasing element movable along a longitudinal axis of the first coupling device, wherein the first coupling device is either provided as a male connector comprising a nipple and an engagement surface or provided as a female connector comprising a securing sleeve, movable along a longitudinal axis, and is provided with an engagement device, wherein the pinion is functionally coupled to the releasing element and the releasing element is configured for disengaging of the engagement device of the first coupling device or an engagement device of the second coupling device, wherein a valve opening element is arranged with the first coupling device for opening the valve arranged with the second coupling device.

8. The device according to claim 7, wherein the first coupling device comprises a motor for driving the pinion.

9. The device according to claim 7, wherein the valve opening element is a tip of the nipple or a securing sleeve or the releasing element.

10. The device according to claim 7, wherein the longitudinal axis is arranged horizontally or vertically.

11. The device according to claim 7, wherein the engagement device comprises a spring element and an engagement claw, that is flexible.

12. The device according to claim 7, wherein the first coupling device is provided as a male connector, wherein the pinion is coupled with the releasing element and the releasing element pushes against a securing sleeve arranged with the first coupling device for disengaging the engaging device.

13. The device according to claim 7, wherein the first coupling device is provided as a female connector, wherein the securing sleeve and the releasing element are provided as a single sleeve arranged on the first coupling device, wherein the pinion is arranged for moving the single sleeve along the longitudinal axis.

14. The device according to claim 7, wherein the first coupling device is provided as female connector, wherein the securing sleeve and the releasing element are provided as sleeves concentrically arranged on the first coupling device, wherein the pinion is arranged for moving the securing sleeve along the longitudinal axis.

15. The device according to claim 7, wherein the device is an irrigation robot.

16. A system for automated coupling of device to a water supply, the device comprising a first coupling device having a central duct and the water supply comprising a second coupling device having a central duct, the first coupling device and the second coupling device being provided as a male connector and a female connector respectively, wherein the coupling device provided as the male connector comprises a nipple and an engagement surface, wherein the coupling device provided as the female connector is provided with a securing sleeve, movable along a longitudinal axis, and is provided with an engagement device for engaging with the engagement surface of the coupling device provided as the male connector, the second coupling device comprising a valve, wherein the first coupling device comprises a pinion and a releasing element movable along a longitudinal axis of the first coupling device, wherein the pinion is functionally coupled to the releasing element and wherein a movement of the releasing element induces a disengagement of the engagement device, wherein the second coupling device is provided as a female connector, and the first coupling device is provided as a male connector, wherein the pinion is coupled with the releasing element and the releasing element pushes against the securing sleeve arranged with the first coupling device for disengaging the engaging device, or wherein the second coupling device is provided as the male connector and the first coupling device is provided as the female connector, wherein the securing sleeve and the releasing element are provided as sleeves concentrically arranged on the first coupling device, wherein the pinion is arranged for moving the securing sleeve along the longitudinal axis.

17. The system according to claim 16, wherein the valve comprises a seal cone and a valve opening member.

18. The system according to claim 17, wherein the second coupling device is provided as the male connector and the first coupling device is provided as the female connector, wherein the securing sleeve and the releasing element are provided as a single sleeve arranged on the first coupling device, wherein the pinion is arranged for moving the sleeve along the longitudinal axis.

* * * * *